United States Patent
Kim et al.

(10) Patent No.: US 9,544,568 B2
(45) Date of Patent: Jan. 10, 2017

(54) IMAGE DISPLAY APPARATUS AND METHOD FOR OPERATING THE SAME

(75) Inventors: Haktae Kim, Seoul (KR); Yonguk Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 673 days.

(21) Appl. No.: 12/793,879

(22) Filed: Jun. 4, 2010

(65) Prior Publication Data

US 2011/0032330 A1    Feb. 10, 2011

Related U.S. Application Data

(60) Provisional application No. 61/184,319, filed on Jun. 5, 2009, provisional application No. 61/184,852, filed on Jun. 8, 2009.

(51) Int. Cl.
*H04N 13/00*    (2006.01)
*G09G 3/00*    (2006.01)

(52) U.S. Cl.
CPC .......... *H04N 13/0059* (2013.01); *G09G 3/003* (2013.01); *H04N 13/004* (2013.01); *H04N 13/007* (2013.01); *H04N 13/0029* (2013.01); *H04N 13/0048* (2013.01); *G09G 2354/00* (2013.01); *H04N 2213/005* (2013.01)

(58) Field of Classification Search
None
See application file for complete search history.

(56) References Cited

U.S. PATENT DOCUMENTS

| | | | |
|---|---|---|---|
| 7,428,018 B2* | 9/2008 | Kim et al. | 348/564 |
| 2004/0125447 A1* | 7/2004 | Sato et al. | 359/462 |
| 2006/0080677 A1* | 4/2006 | Louie | 719/323 |
| 2006/0203085 A1* | 9/2006 | Tomita | 348/51 |
| 2006/0236339 A1* | 10/2006 | Kim et al. | H04N 5/44513 725/38 |
| 2007/0002279 A1* | 1/2007 | Berman | G02B 27/2228 353/20 |
| 2007/0003134 A1* | 1/2007 | Song et al. | 382/154 |
| 2007/0300184 A1* | 12/2007 | Song | 715/810 |
| 2008/0158346 A1 | 7/2008 | Okamoto et al. | 348/47 |

(Continued)

FOREIGN PATENT DOCUMENTS

| | | |
|---|---|---|
| CN | 1490643 | 4/2004 |
| CN | 1882106 | 12/2006 |

(Continued)

OTHER PUBLICATIONS

European Search Report issued in Application No. 10783615.7 dated Jun. 4, 2014.

(Continued)

*Primary Examiner* — James M Anderson, II
(74) *Attorney, Agent, or Firm* — Ked & Associates, LLP

(57) ABSTRACT

An image display apparatus and a method for operating the same are disclosed. The method for operating an image display apparatus includes entering a three-dimensional (3D) setting menu, upon receipt of a 3D view input, displaying the 3D setting menu on a display, for setting at least one of a 3D format or an ordering of left-eye and right-eye images that form a 3D image, and displaying a 3D image obtained by performing 3D processing on an input image according to the set 3D format or the set ordering of left-eye and right-eye images on the display.

17 Claims, 28 Drawing Sheets

(56) References Cited

U.S. PATENT DOCUMENTS

| | | |
|---|---|---|
| 2008/0159708 A1* | 7/2008 | Kazama et al. ............... 386/69 |
| 2009/0232389 A1* | 9/2009 | Lee et al. ...................... 382/154 |
| 2009/0237494 A1* | 9/2009 | Oota et al. ...................... 348/51 |

FOREIGN PATENT DOCUMENTS

| | | |
|---|---|---|
| CN | 101114213 A | 1/2008 |
| CN | 101198074 | 6/2008 |
| CN | 101212699 | 7/2008 |
| JP | 11-069381 A | 3/1999 |
| KR | 10-2006-0100264 A | 9/2006 |
| KR | 10-2008-0034419 A | 4/2008 |
| WO | WO 2008/013352 A1 | 1/2008 |
| WO | WO 2008/024940 | 2/2008 |

OTHER PUBLICATIONS

Peter Wimmer : "Stereoscopic Player and Stereoscopic Multiplexer: a computer-based system for stereoscopic video playback and recording"; Proceeding of SPIE, vol. 5664; Mar. 22, 2005; pp. 400-411 (XP 055092976).

Peter Wimmer: "Stereoscopic Player and Stereoscopic Multiplexer"; Internet citation; Nov. 26, 2006; pp. 7, 13 (XP 002641946).

* cited by examiner (a)

(b)

(c)

(d)

(e)

(a)　　　　　　　　　　　　(b)

IMAGE DISPLAY APPARATUS AND METHOD FOR OPERATING THE SAME

CROSS-REFERENCE TO RELATED APPLICATION

This application claims the benefit of U.S. Provisional Application No. 61/184,319 filed on Jun. 5, 2009 and U.S. Provisional Application No. 61/184,852 filed on Jun. 8, 2009, in the USPTO and the disclosure of which is incorporated herein by reference.

BACKGROUND OF THE INVENTION

1. Field of the Invention

The present invention relates to an image display apparatus and a method for operating the same, and more particularly, to an image display apparatus for increasing user convenience when displaying a three-dimensional (3D) image and a method for operating the same.

2. Description of the Related Art

An image display apparatus has a function of displaying images viewable to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting such as robustness against noise, less data loss, ease of error correction, and the ability to provide high-definition, clear images. Digital broadcasting also allows interactive services for viewers.

Many studies have recently been conducted on 3D imaging and stereoscopy is being widely accepted and popular in computer graphics and other various environments and technologies.

SUMMARY OF THE INVENTION

Therefore, the present invention has been made in view of the above problems, and it is an object of the present invention to provide an image display apparatus for increasing user convenience when displaying a 3D image and a method for operating the same.

It is another object of the present invention to provide an image display apparatus for enabling a user to easily select a 3D format or an ordering of left-eye and right-eye images that form a 3D image, when displaying the 3D image, and a method for operating the same.

In accordance with an aspect of the present invention, the above and other objects can be accomplished by the provision of a method for operating an image display apparatus, including entering a 3D setting menu, upon receipt of a 3D view input, displaying the 3D setting menu on a display, for setting at least one of a 3D format or an ordering of left-eye and right-eye images that form a 3D image, and displaying a 3D image obtained by performing 3D processing on an input image according to the set 3D format or the set ordering of left-eye and right-eye images on the display.

In accordance with another aspect of the present invention, provided herein is a method for operating an image display apparatus, including receiving a left-eye image and a right-eye image, generating a first 3D image according to a left-eye and then right-eye image ordering, generating a second 3D image according to a right-eye and then left-eye image ordering, generating a third 3D image using at least part of the first 3D image and at least part of the second 3D image, and displaying the third 3D image on a display.

In accordance with another aspect of the present invention, provided herein is a method for operating an image display apparatus, including entering a 3D setting menu, displaying an object indicating a plurality of 3D formats and an object for setting an ordering of left-eye and right-eye images that form a 3D image in a first area of a display, and displaying, upon selection of one of the plurality of 3D formats and then upon selection of an ordering of left-eye and right-eye images according to the selected 3D format, a 3D image in a second area of the display according to the selected 3D format and the selected ordering of left-eye and right-eye images.

In accordance with another aspect of the present invention, provided herein is a method for operating an image display apparatus, including entering a 3D setting menu, displaying an object indicating a plurality of 3D formats in a first area of a display, and displaying, upon selection of one of the plurality of 3D formats, a first 3D image based on a left-eye and then right-eye image ordering and a second 3D image based on a right-eye and then left-eye image ordering in a second area of the display.

In accordance with another aspect of the present invention, provided herein is a method for operating an image display apparatus, including entering a 3D setting menu, displaying an object indicating a plurality of 3D formats in a first area of a display, and displaying, upon selection of one of the plurality of 3D formats, a 3D image in a second area of the display according to the selected 3D format.

In accordance with a further aspect of the present invention, provided herein is an image display apparatus including a display for displaying a 3D setting menu for setting at least one of a 3D format and an ordering of left-eye and right-eye images that form a 3D image, and a controller for generating a 3D image by performing 3D processing on an input image according to the set 3D format or the set ordering of left-eye and right-eye images and controlling the 3D image to be displayed on the display.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described below with reference to the attached drawings.

The terms "module", "portion", and "unit" attached to describe the names of components are used herein to help the understanding of the components and thus they should not be considered as having specific meanings or roles. Accordingly, the terms "module" and "portion" may be interchangeable in their use.

Figure 1:
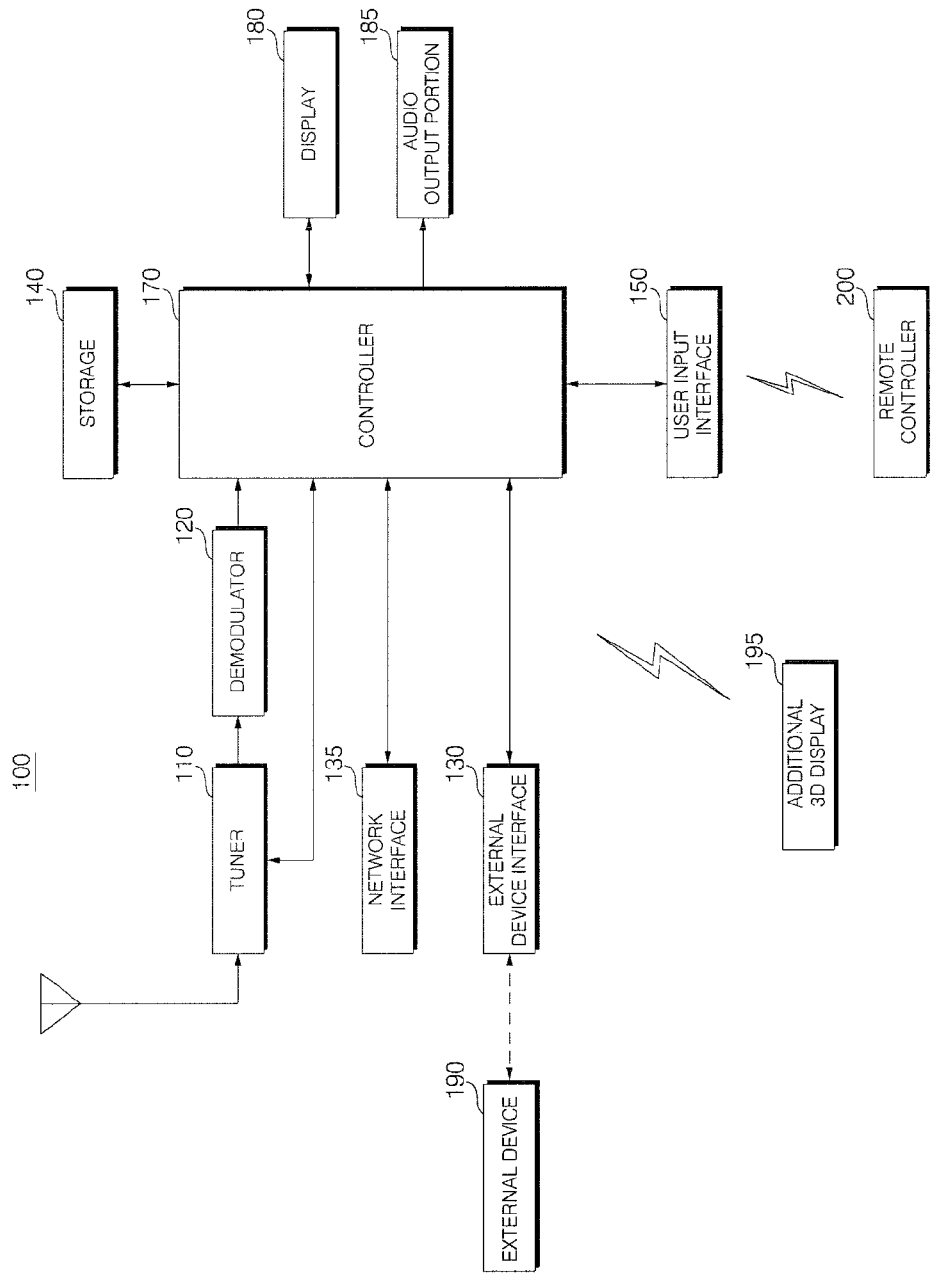
FIG. 1 is a block diagram of an image display apparatus according to an exemplary embodiment of the present invention.

FIG. 1 is a block diagram of an image display apparatus according to an exemplary embodiment of the present invention.

Referring to FIG. 1, an image display apparatus 100 according to an exemplary embodiment of the present invention may include a tuner 110, a demodulator 120, an external device interface 130, a network interface 135, a storage 140, a user input interface 150, a controller 170, a display 180, an audio output portion 185, and an additional 3D display 195.

The tuner 110 selects a Radio Frequency (RF) broadcast signal corresponding to a channel selected by a user from among a plurality of RF broadcast signals received through an antenna or an RF broadcast signal corresponding to each of pre-memorized channels and downconverts the RF broadcast signal to a digital Intermediate Frequency (IF) signal or an analog baseband Audio/Video (A/V) signal.

More specifically, if the RF broadcast signal is a digital broadcast signal, the tuner 110 downconverts the RF broadcast signal to a digital IF signal, DIF. On the other hand, if the RF broadcast signal is an analog broadcast signal, the tuner 110 downconverts the RF broadcast signal to an analog baseband A/V signal, CVBS/SIF. That is, the tuner 110 may be a hybrid tuner capable of processing not only digital broadcast signals but also analog broadcast signals. The analog baseband A/V signal CVBS/SIF may be directly input to the controller 170.

The tuner 110 may be able to receive RF broadcast signals from an Advanced Television Systems Committee (ATSC) single-carrier system or from a Digital Video Broadcasting (DVB) multi-carrier system.

The tuner 110 may sequentially select RF broadcast signals corresponding to all broadcast channels previously memorized in the image display apparatus 100 by a channel-add function among from a plurality of RF signals received through the antenna, and may downconvert the selected RF broadcast signals to IF signals or baseband A/V signals.

The demodulator 120 receives the digital IF signal DIF from the tuner 110 and demodulates the digital IF signal DIF.

For example, if the digital IF signal DIF is an ATSC signal, the demodulator 120 performs 8-Vestigal SideBand (VSB) demodulation on the digital IF signal DIF. The demodulator 120 may also perform channel decoding. For the channel decoding, the demodulator 120 may include a Trellis decoder (not shown), a deinterleaver (not shown) and a Reed-Solomon decoder (not shown) and thus perform Trellis decoding, deinterleaving and Reed-Solomon decoding.

For example, if the digital IF signal DIF is a DVB signal, the demodulator 120 performs Coded Orthogonal Frequency Division Multiple Access (COFDMA) demodulation on the digital IF signal DIF. The demodulator 120 may also perform channel decoding. For the channel decoding, the demodulator 120 may include a convolution decoder (not shown), a deinterleaver (not shown), and a Reed-Solomon decoder (not shown) and thus perform convolutional decoding, deinterleaving, and Reed-Solomon decoding.

The demodulator 120 may perform demodulation and channel decoding on the digital IF signal DIF received from the tuner 120, thereby obtaining a stream signal TS. The stream signal TS may be a signal in which a video signal, an audio signal and a data signal are multiplexed. For example, the stream signal TS may be a Moving Picture Experts Group-2 (MPEG-2) Transport Stream (TS) signal obtained by multiplexing an MPEG-2 video signal and a Dolby AC-3 audio signal. The MPEG-2 TS signal may include a 4-byte header and a 184-byte payload.

In order to properly handle not only ATSC signals but also DVB signals, the demodulator 120 may include an ATSC demodulator and a DVB demodulator.

The stream signal TS may be input to the controller 170 and thus subjected to demultiplexing and A/V signal processing. The processed video and audio signals are output to the display 180 and the audio output portion 185, respectively.

The external device interface 130 may interface between an external device 190 and the image display apparatus 100. For the interfacing, the external device interface 130 may include an A/V Input/Output (I/O) portion (not shown) or a wireless communication module (not shown).

The external device interface 130 may be connected wirelessly or wiredly to the external device 190 such as a Digital Versatile Disc (DVD), a Blu-ray disc, a game player, a camera, a camcorder, or a computer (e.g. a laptop computer). Then, the external device interface 130 receives video, audio, and/or data signals from the external device 190 and transmits the received external input signals to the controller 170. In addition, the external device interface 130 may output video, audio, and/or data signals processed by the controller 170 to the external device 190. In order to receive or transmit audio, video, and/or data signals from or to the external device 190, the external device interface 130 may include the A/V I/O portion (not shown) or the wireless communication module (not shown).

To provide the video and audio signals received from the external device 190 to the image display apparatus 100, the A/V I/O portion may include a Universal Serial Bus (USB) port, a Composite Video Banking Sync (CVBS) port, a component port, a Super-video (S-video) (analog) port, a Digital Visual Interface (DVI) port, a High-Definition Multimedia Interface (HDMI) port, a Red-Green-Blue (RGB) port, and a D-sub port.

The wireless communication module may perform short-range wireless communication with other electronic devices. For the short-range wireless communication over a network, the wireless communication module may operate in compliance with communication standards such as Bluetooth, Radio-Frequency IDentification (RFID), Infrared Data Association (IrDA), Ultra WideBand (UWB), ZigBee, and Digital Living Network Alliance (DLNA).

The external device interface 130 may be connected to various set-top boxes through at least one of the USB port, the CVBS port, the component port, the S-video port, the DVI port, the HDMI port, the RGB port, and the D-sub port and may thus receive data from or transmit data to the various set-top boxes.

Further, the external device interface 130 may transmit data to or receive data from the additional 3D display 195.

The network interface 135 interfaces between the image display apparatus 100 and a wired/wireless network such as the Internet. The network interface 135 may include an Ethernet port for connection to a wired network. For connection to wireless networks, the network interface 135 may operate in conformance with communication standards such as Wireless Local Area Network (WLAN) (i.e., Wi-Fi), Wireless Broadband (Wibro), World Interoperability for Microwave Access (WiMax), and High Speed Downlink Packet Access (HSDPA).

The network interface 135 may receive contents or data from the Internet, a content provider, or a network provider over a network. Specifically, the received contents or data may include contents such as movies, advertisements, games, Video-on-Demand (VoD) files, and broadcast signals and information related to the contents. The network interface 135 may also receive update information and update files of firmware from the network operator. The network interface 135 may transmit data to the Internet, the content provider, or the network provider.

The network interface 135 may be connected to, for example, an Internet Protocol (IP) TV. To enable interactive communication, the network interface 135 may provide video, audio and/or data signals received from an IPTV set-top box to the controller 170 and provide signals processed by the controller 170 to the IPTV set-top box.

Depending on the types of transmission networks, the IPTV may refer to Asynchronous Digital Subscriber Line-TV (ADSL-TV), Very high data rate Digital Subscriber Line-TV (VDSL), Fiber To The Home-TV (FTTH-TV), TV over DSL, Video over DSL, TV over IP (IPTV), Broadband TV (BTV), etc. In addition, the IPTV may cover Internet TV and full browsing TV in its meaning.

The storage 140 may store various programs for processing and controlling signals by the controller 170, and may also store processed video, audio and/or data signals.

The storage 140 may temporarily store a video, audio and/or data signal received from the external device interface 130. The storage 140 may memorize broadcast channels by the channel-add function such as a channel map.

The storage 140 may include, for example, at least one of a flash memory-type storage medium, a hard disc-type storage medium, a multimedia card micro-type storage medium, a card-type memory (e.g. a Secure Digital (SD) or eXtreme Digital (XD) memory), a Random Access Memory (RAM), and a Read-Only Memory (ROM) such as Electrical Erasable and Programmable ROM (EEPROM). The image display apparatus 100 may play content files stored in the storage 140 (e.g. video files, still image files, music files, and text files), for the user.

While the storage 140 is shown in FIG. 1 as configured separately from the controller 170, to which the present invention is not limited, the storage 140 may be incorporated into the controller 170, for example.

The user input interface 150 transmits a signal received from the user to the controller 170 or transmits a signal received from the controller 170 to the user.

For example, the user input interface 150 may receive various user input signals such as a power-on/off signal, a channel selection signal, and a screen setting signal from a remote controller 200 or may transmit a signal received from the controller 170 to the remote controller 200, according to various communication schemes, for example, RF communication and IR communication.

For example, the user input interface 150 may provide the controller 170 with user input signals or control signals received from local keys (not shown), such as inputs of a power key, a channel key, and a volume key, and setting values.

Also, the user input interface 150 may transmit a user input signal received from a sensor unit (not shown) for sensing a user's gesture to the controller 170 or transmit a signal received from the controller 170 to the sensor unit. The sensor unit may include a touch sensor, a voice sensor, a position sensor, a motion sensor, etc.

The controller 170 may demultiplex the stream signal TS received from the tuner 110, the demodulator 120, or the external device interface 130 into a number of signals and process the demultiplexed signals so that the processed signals can be output as audio and video data.

The video signal processed by the controller 170 may be displayed as an image on the display 180. The video signal processed by the controller 170 may also be transmitted to an external output device through the external device interface 130.

The audio signal processed by the controller 170 may be output to the audio output portion 185. Also, the audio signal processed by the controller 170 may be transmitted to the external output device through the external device interface 130.

While not shown in FIG. 1, the controller 170 may include a demultiplexer and a video processor, which will be described later with reference to FIG. 2.

Besides, the controller 170 may provide overall control to the image display apparatus 100. For example, the controller 170 may control the tuner 110 to select an RF broadcast signal corresponding to a user-selected channel or a pre-memorized channel.

The controller 170 may control the image display apparatus 100 according to a user command received through the user input interface 150 or according to an internal program. For example, the controller 170 controls the tuner 110 to receive a channel selected according to a specific channel selection command received through the user input interface 150 and processes a video, audio and/or data signal of the selected channel. The controller 170 outputs the processed video or audio signal along with information about the user-selected channel to the display 180 or the audio output portion 185.

In another example, the controller 170 outputs a video or audio signal received from the external device 190 such as a camera or a camcorder through the external device interface 130 to the display 180 or the audio output portion 185 according to an external device video play command received through the external device interface 150.

The controller 170 may control the display 180 to display images. For instance, the controller 170 may control the display 180 to display a broadcast image received from the tuner 110, an external input image received through the external device interface 130, an image received through the network interface 130, or an image stored in the storage 140.

The image displayed on the display 180 may be a Two-Dimensional (2D) or Three-Dimensional (3D) (stereoscopic) still image or moving picture.

The controller 170 controls a particular object in the image displayed on the display 180 to be rendered as a 3D object. For example, the particular object may be at least one of a linked Web page (e.g. from a newspaper, a magazine, etc.), an Electronic Program Guide (EPG), a menu, a widget, an icon, a still image, a moving picture, and text.

This 3D object may be processed to have a different depth from the image displayed on the display 180. Preferably, the 3D object may appear protruding relative to the image displayed on the display 180.

The controller 170 may locate the user based on an image captured by a camera portion (not shown). Specifically, the controller 170 may measure the distance (z-axis coordinates) between the user and the image display apparatus 100. In addition, the controller 170 may calculate x-axis and y-axis coordinates corresponding to the position of the user on the display 180.

The image display apparatus 100 may further include a channel browsing processor (not shown) for generating thumbnail images corresponding to channel signals or external input signals. The channel browsing processor may extract some of the video frames of each of stream signals TS received from the demodulator 120 or stream signals received from the external device interface 130 and display the extracted video frames on the display 180 as thumbnail images. The thumbnail images may be output to the controller 170 after they are encoded or as they are. Also, it is possible to encode the thumbnail images into a stream and output the stream to the controller 170. The controller 170 may display a thumbnail list including a plurality of received thumbnail images on the display 180. The thumbnail list may be displayed in a part of the display 180 with an image displayed on the display 180, that is, as a compact view, or the thumbnail list may occupy almost all area of the display 180 as a full view. The thumbnail images may be updated sequentially in the thumbnail list.

The display 180 generates driving signals by converting a processed video signal, a processed data signal, an On Screen Display (OSD) signal, and a control signal received from the controller 170 or a video signal, a data signal, and a control signal received from the external device interface 130.

The display 180 may be implemented into various types of displays such as a Plasma Display Panel (PDP), a Liquid Crystal Display (LCD), an Organic Light-Emitting Diode (OLED), and a flexible display. Preferably, the display 180 is configured as a 3D display according to an exemplary embodiment of the present invention.

For 3D visualization, the display 180 may be configured into an auto-stereoscopic 3D display (glasses-free) or a traditional stereoscopic 3D display (with glasses).

Auto-stereoscopy is any method of displaying 3D images without any additional display, for example, special glasses on the part of a user. Thus, the display 180 displays 3D images on its own. Renticular and parallax barrier are examples of auto-stereoscopic 3D imaging.

The traditional stereoscopy requires an additional display besides the display 180 in order to display 3D images. The additional display may be a Head Mount Display (HMD) type, a glasses type, etc. As special 3D glasses, polarized glasses operate in a passive manner, whereas shutter glasses operate in an active manner. Also, HMD types may be categorized into passive ones and active ones.

Exemplary embodiments of the present invention will be described, centering on 3D glasses as the additional 3D display 195 for 3D visualization. The 3D glasses 195 may conceptually include passive polarized glasses, active shutter glasses, and the HMD type.

The display 180 may also be implemented as a touch screen so that it is used not only as an output device but also as an input device.

The audio output portion 185 may receive a processed audio signal (e.g., a stereo signal, a 3.1-channel signal or a 5.1-channel signal) from the controller 170 and output the received audio signal as voice. The audio output portion 185 may be implemented into various types of speakers.

To sense a user's gesture, the image display apparatus 100 may further include the sensor unit (not shown) that has at least one of a touch sensor, a voice sensor, a position sensor, and a motion sensor, as stated before. A signal sensed by the sensor unit may be output to the controller 170 through the user input interface 150.

The controller 170 may sense a user's gesture from an image captured by the camera portion or a signal sensed by the sensor unit, or by combining the captured image and the sensed signal.

The remote controller 200 transmits a user input to the user input interface 150. For the transmission of a user input, the remote controller 200 may use various communication techniques such as Bluetooth, RF, IR, Ultra WideBand (UWB) and ZigBee. In addition, the remote controller 200 may receive a video signal, an audio signal and/or a data signal from the user input interface 150 and output the received signals visually or audibly.

The above-described image display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs. Alternatively, the image display apparatus 100 may be a mobile digital broadcast receiver capable of at least one of terrestrial DMB broadcast programs, satellite DMB broadcast programs, ATSC-M/H broadcast programs, DVB-H (COFDM) broadcast programs, and Media Forward Link Only (MediaFLO) broadcast programs, or a mobile digital broadcast receiver capable of receiving cable, satellite and/or IPTV broadcast programs.

The image display apparatus 100 as set forth herein may be any of a TV receiver, a mobile phone, a smart phone, a laptop computer, a digital broadcasting terminal, a Personal Digital Assistant (PDA), a Portable Multimedia Player (PMP), etc.

The block diagram of the image display apparatus 100 illustrated in FIG. 1 is an exemplary embodiment of the present invention. Depending on the specification of the image display apparatus 100 in real implementation, the components of the image display apparatus 100 may be incorporated, added or omitted. That is, two or more components are incorporated into one component or one component may be configured as separate components, when needed. In addition, the function of each block is described for the purpose of describing the exemplary embodiment of the present invention and thus specific operations or devices should not be construed as limiting the scope and spirit of the present invention.

Figure 2:
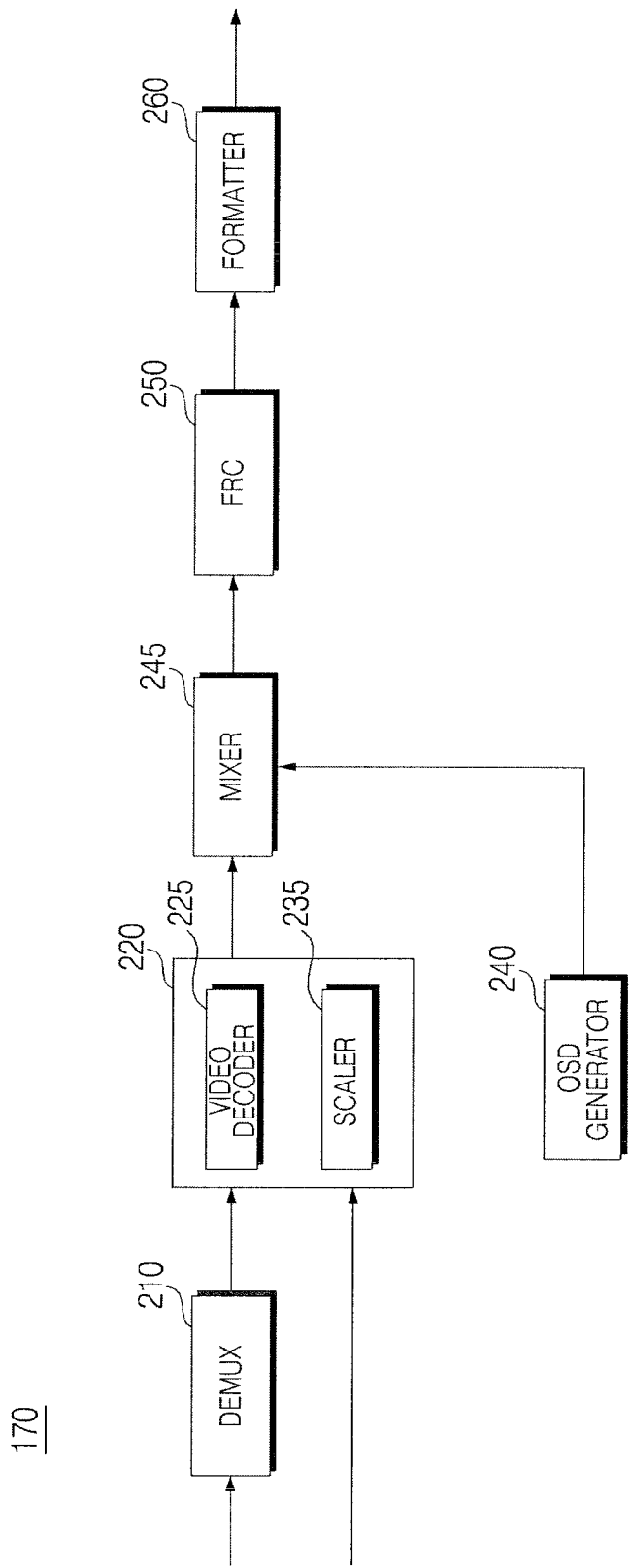
FIG. 2 is a block diagram of a controller illustrated in FIG. 1.
Figure 3:
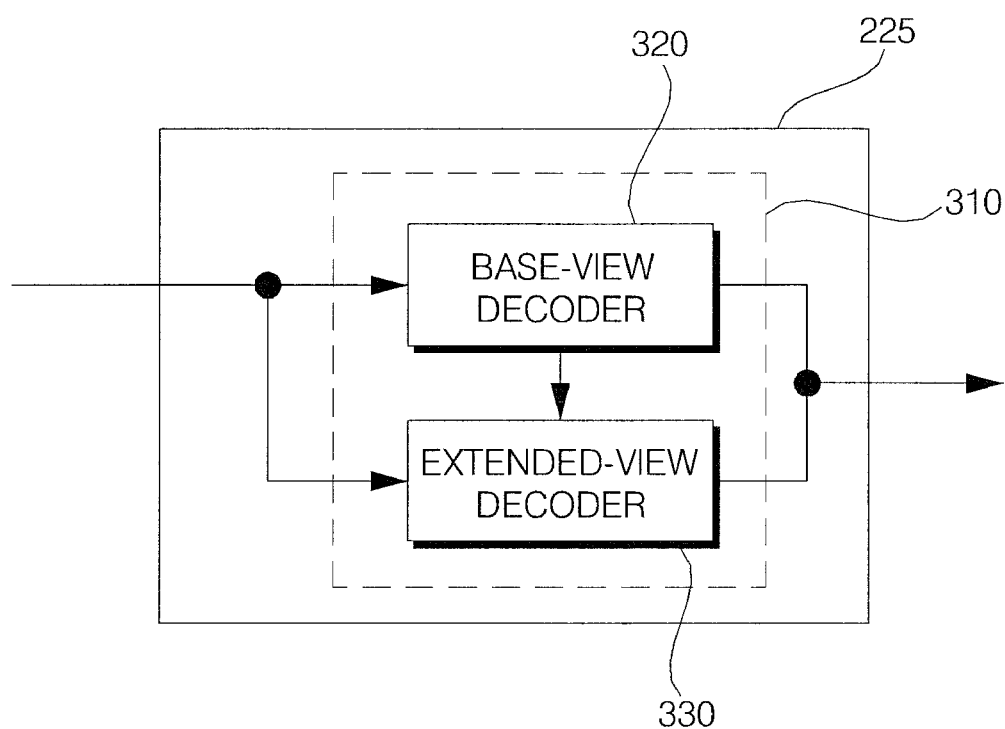
FIG. 3 is a block diagram of a video decoder illustrated in FIG. 2.
Figure 4:
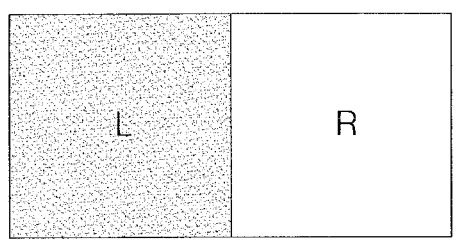
FIGS. 4A to 4E illustrate 3D formats.
Figure 4:
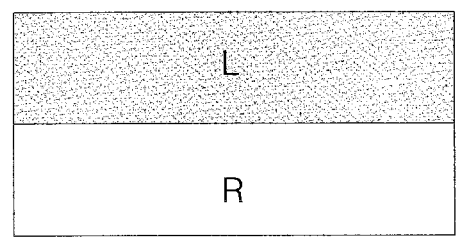
Figure 4:
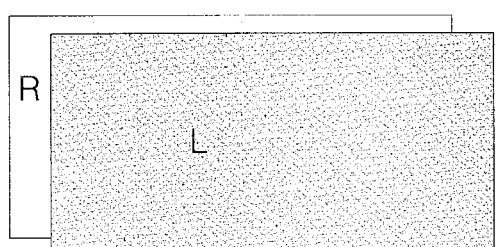
Figure 4:
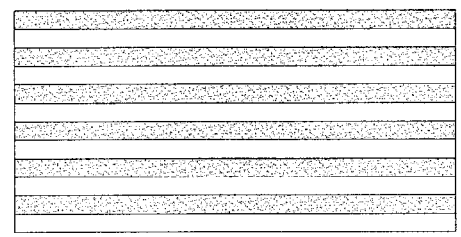
Figure 4:
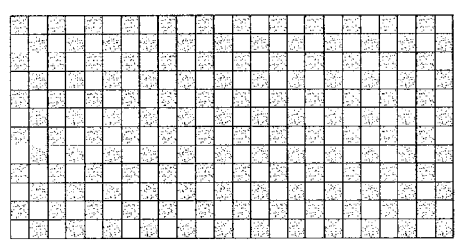
Figure 5:
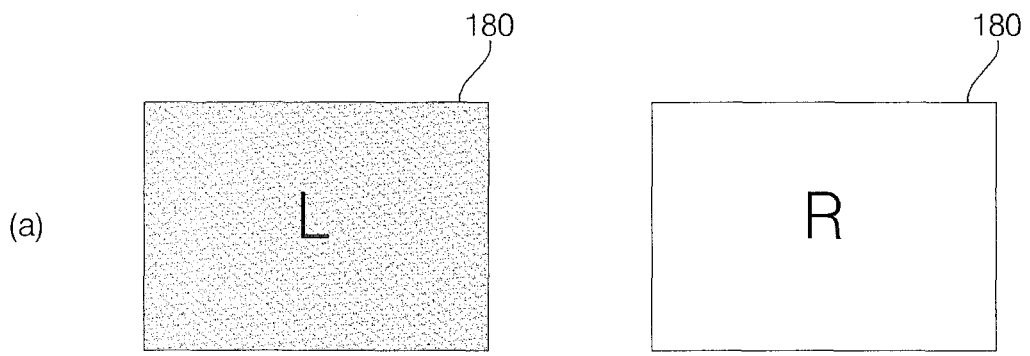
FIGS. 5A and 5B illustrate operations of an additional glasses-type display according to 3D formats illustrated in FIGS. 4A to 4E.
Figure 5:
Figure 5:
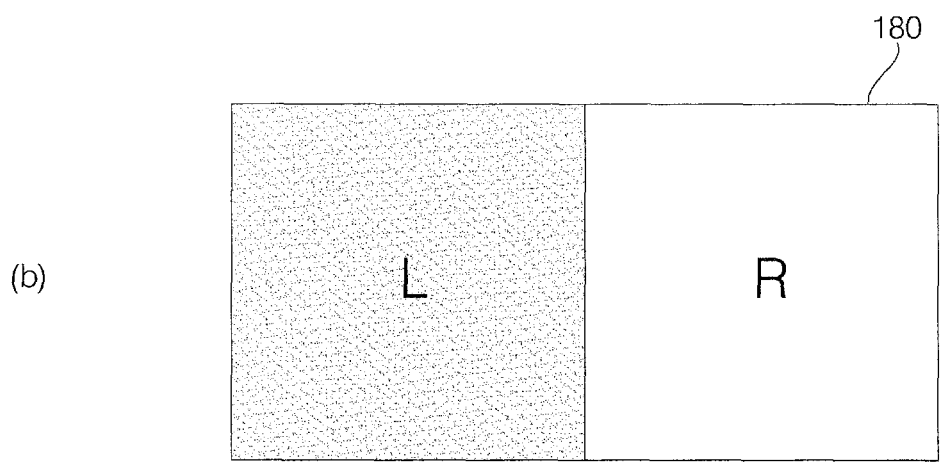
Figure 5:
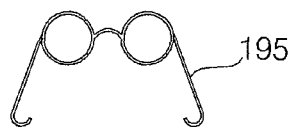

FIG. 2 is a block diagram of the controller illustrated in FIG. 1, FIG. 3 is a block diagram of a video decoder illustrated in FIG. 2, FIGS. 4A to 4E illustrate 3D formats, and FIGS. 5A and 5B illustrate operations of an additional glasses-type display according to 3D formats illustrated in FIGS. 4A to 4E.

Referring to FIGS. 2 to 5B, the controller 170 may include a Demultiplexer (DEMUX) 210, a video processor 220, an OSD generator 240, a mixer 245, a Frame Rate Converter (FRC) 250, and a formatter 260 according to an exemplary embodiment of the present invention. The controller 170 may further include an audio processor (not shown) and a data processor (not shown).

The DEMUX 210 demultiplexes an input stream. For example, the DEMUX 210 may demultiplex an MPEG-2 TS into a video signal, an audio signal, and a data signal. The input stream signal may be received from the tuner 110, the demodulator 120 or the external device interface 130.

The video processor 220 may process the demultiplexed video signal. For the video signal processing, the video processor 220 may include a video decoder 225 and a scaler 235.

The video decoder 225 decodes the demultiplexed video signal and the scaler 235 scales the resolution of the decoded video signal so that the video signal can be displayed on the display 180.

The video decoder 225 may be provided with decoders that operate based on various standards. For example, the video decoder 225 may has at least one of an MPEG-2 decoder, an H.264 decoder, an MPEG-C (MPEG-C part 3) decoder, an Multi-view Video Coding (MVC) decoder, and a Free-viewpoint TV (FTV) decoder.

FIG. 3 illustrates an example of a 3D video decoder 310 for decoding a 3D image signal in the video decoder 225.

The 3D video decoder receives a demultiplexed video signal which may be, for example, an MVC-coded video signal, a dual AVC-coded video signal, or a mixture of individually coded left-eye and right-eye images.

If the input demultiplexed video signal is the mixture signal of coded left-eye and right-eye images, a 2D video decoder may be still used for decoding the input demultiplexed video signal. For example, if the demultiplexed video signal is an MPEG-2 coded video signal or an AVC-coded video signal, it may be decoded by an MPEG-2 decoder or an AVC decoder.

The 3D video decoder 310 may be configured to be an MVC decoder including a base-view decoder 320 and an extended-view decoder 330.

For example, if the coded 3D video signal input to the 3D video decoder 310 includes an MVC-coded extended-view video signal, a base-view video signal being the counterpart of the extended-view video signal should be decoded in order to decode the extended-view video signal. Accordingly, a base-view video signal decoded by the base-view decoder 320 is provided to the extended-view decoder 330.

As a consequence, a time delay occurs while the extended-view video signal of the input 3D video signal is decoded in the extended-view decoder 330. Then the decoded base-view video signal and the decoded extended-view video signal are mixed as the decoded 3D video signal.

For example, if the coded 3D video signal input to the 3D video decoder 310 includes an AVC-coded extended-view video signal, a base-view video signal and the extended-view video signal may be decoded in parallel, compared to the MVC-coded 3D video signal. Accordingly, the base-view decoder 320 and the extended-view decoder 330 decode the base-view video signal and the extended-view video signal, independently. Then the decoded base-view video signal and the decoded extended-view video signal are mixed as the decoded 3D video signal.

Unlike the configuration of the 3D video decoder 310 illustrated in FIG. 3, the 3D video decoder 310 may be configured so as to include a color image decoder and a depth image decoder. When a 3D image is separately decoded as a color image and a depth image, the color image decoder may decode the color image and the depth image decoder may decode the depth image. For decoding the depth image, the color image may be used as a reference image.

The decoded video signal processed by the video processor 220 may be a 2D video signal, a 3D video signal, or a combination of both.

For example, an external video signal received from the external device 190 or a video signal of a broadcast signal received from the tuner 110 is a 2D video signal, a 3D video signal, or a combination of both. Accordingly, the controller 170, especially the video processor 220 may output a processed 2D video signal, a processed 3D video signal, and a combination of both.

The decoded video signal from the video processor 220 may have any of various available formats. For example, the decoded video signal may be a 3D video signal with a color image and a depth image or a 3D video signal with multi-view image signals. The multi-view image signals may include, for example, a left-eye image signal and a right-eye image signal.

For 3D visualization, such 3D formats as illustrated in FIGS. 4A to 4E are available. The 3D formats are a side-by-side format (FIG. 4A), a top/bottom format (FIG. 4B), a frame sequential format (FIG. 4C), an interlaced format (FIG. 4D), and a checker box format (FIG. 4E). A left-eye image L and a right-eye image R are arranged side by side in the side by side format. The left-eye image L and the right-eye image R are stacked vertically in the top/bottom format, while they are arranged in time division in the frame sequential format. In the interlaced format, the left-eye image L and the right-eye image R alternate line by line. The left-eye image L and the right-eye image R are mixed on a box basis in the checker box format.

The OSD generator 240 generates an OSD signal on its own or according to a user input. For example, the OSD generator 240 may generate signals by which a variety of information is displayed as graphic images or text on the display 180, according to user input signals or control signals. The OSD signal may include various data such as a User Interface (UI) screen, a variety of menu screens, widgets, icons, etc. Also, the OSD signal may include a 2D object and/or a 3D object.

Especially, the OSD generator 240 may generate a 3D setting menu in accordance with an exemplary embodiment of the present invention. The 3D setting menu may include at least one of a 3D format setting menu for selecting and setting one of a plurality of 3D formats or a 3D image ordering menu for setting an ordering of left-eye and right-eye images, which will be described later in detail with reference to FIG. 8 and related drawings.

The mixer 250 may mix the decoded video signal processed by the video processor 220 with the OSD signal generated from the OSD generator 240. The OSD signal and the decoded video signal each may include at least one of a 2D signal or a 3D signal.

The FRC 255 may change the frame rate of the mixed vide signal received from the mixer 245. For example, a frame rate of 60 Hz is converted to a frame rate of 120 or 240 Hz. When the frame rate is changed from 60 Hz to 120 Hz, the same first frame is inserted between a first frame and a second frame, or a predicted third frame is inserted between the first and second frames. If the frame rate is changed from 60 Hz to 240 Hz, three identical frames or three predicted frames are inserted between the first and second frames.

It is also possible to maintain the frame rate of the input image without frame rate conversion. Preferably, when the FRC 250 receives a 2D video signal, it may output the 2D video signal without frame rate conversion. On the other hand, when the FRC 250 receives a 3D video signal, it may change the frame rate of the 3D video signal in the above-described manner.

The formatter 260 may separate a 2D video signal and a 3D video signal from the mixed video signal of the OSD signal and the decoded video signal received from the mixer 245.

Herein, a 3D video signal refers to a signal including a 3D object such as a Picture-In-Picture (PIP) image (still or moving), an EPG that describes broadcast programs, a menu, a widget, text, an object within an image, a figure, a background, or a Web page (e.g. from a newspaper, a magazine, etc.).

The formatter 260 may change the format of a 3D video signal, for example, to one of the 3D formats illustrated in FIGS. 4A to 4E. Accordingly, the additional glasses-type display may operate according to the changed 3D format as illustrated in FIGS. 5A and 5B.

FIG. 5A illustrates an exemplary operation of the 3D glasses 195, especially in the case of shutter glasses, when the formatter 260 outputs a 3D video signal in the frame sequential format illustrated in FIG. 4C.

When the left-eye image L is displayed on the display 180, the left lens is open and the right lens is shut off in the shutter glasses 915. When the right-eye image R is displayed on the display 180, the left lens is shut off and the right lens is open in the shutter glasses 915.

FIG. 5B illustrates another exemplary operation of the 3D glasses 195, especially in the case of polarized glasses, when the formatter 260 outputs a 3D video signal in the side-by-side format illustrated in FIG. 4A. Shutter glasses are also available as the 3D glasses 195 to implement the operation illustrated in FIG. 5B. In this case, the shutter glasses are kept open in both lenses, thus acting like polarized glasses.

Meanwhile, the formatter 260 may convert a 2D video signal to a 3D video signal. For example, the formatter 260 may detect edges or a selectable object from the 2D video signal and generate a 3D video signal with an object based on the detected edges or the selectable object. This 3D video signal may be arranged as separate left-eye and right-eye image signals L and R, as described before.

The audio processor (not shown) of the controller 170 may process the demultiplexed audio signal. For the audio signal processing, the audio processor may have a plurality of decoders.

If the demultiplexed audio signal is a coded audio signal, the audio processor of the controller 170 may decode the audio signal. For example, if the demultiplexed audio signal is an MPEG-2 coded audio signal, it may be decoded by an MPEG-2 decoder. If the demultiplexed audio signal is an MPEG-4 Bit Sliced Arithmetic Coding (BSAC) coded audio signal for terrestrial DMB, it may be decoded by an MPEG-4 decoder. If the demultiplexed audio signal is an MPEG-2-Advanced Audio Coding (AAC) coded audio signal for satellite DMB or DVB-H, it may be decoded by an AAC decoder. If the demultiplexed audio signal is a Dolby AC-3 coded audio signal, it may be decoded by an AC-3 decoder.

The audio processor of the controller 170 may also adjust the base, treble, and volume of the audio signal.

The data processor (not shown) of the controller 170 may process the data signal obtained by demultiplexing the input stream signal. For example, if the data signal is an encoded signal such as an EPG which includes broadcast information specifying the start time, end time, etc. of scheduled broadcast TV or radio programs, the controller 170 may decode the data signal. Examples of an EPG include ATSC-Program and System Information Protocol (PSIP) information and DVB-Service Information (SI). ATSC-PSIP information or DVB-SI information may be included in the header of a TS, i.e., a 2-byte header of an MPEG-2 TS.

While it is shown in FIG. 2 that the mixer 245 mixes signals received from the OSD generator 240 and the video processor 220 and then the formatter 260 performs 3D processing on the mixed signal, to which the present invention is not limited, the mixer 245 may reside after the formatter 260. Thus the formatter 260 may perform 3D processing on a signal received from the video processor 220, the OSD generator 240 may generate an OSD signal and subject the OSD signal to 3D processing, and then the mixer 245 may mix the processed 3D signals from the formatter 260 and the OSD generator 240.

The block diagram of the controller 170 illustrated in FIG. 2 is an exemplary embodiment of the present invention. Depending on the specification of the controller 170 in real implementation, the components of the controller 170 may be incorporated, added or omitted. Especially, the FRC 250 and the formatter 260 may be configured separately outside the controller 170.

Figure 6:
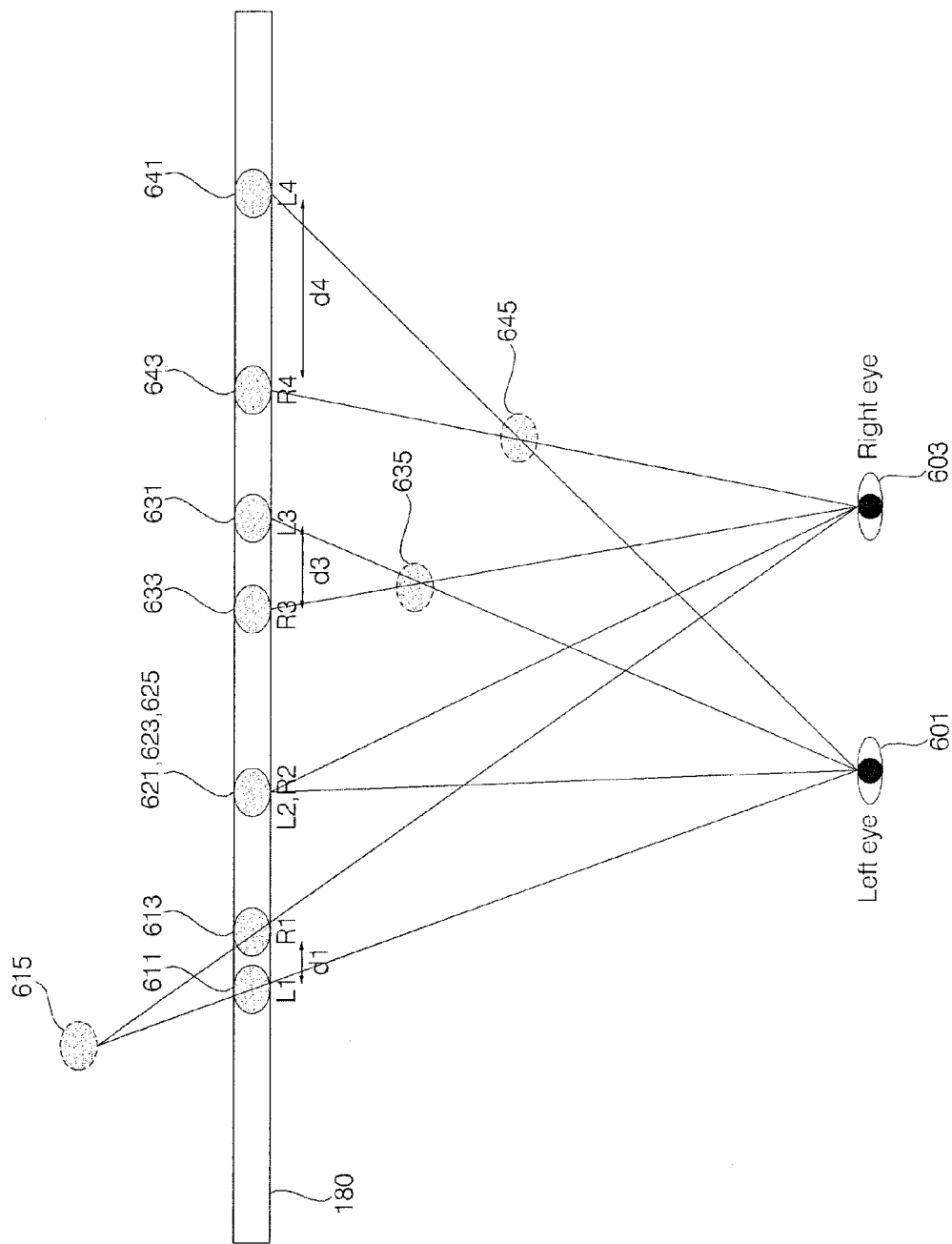
FIG. 6 illustrates formation of 3D images by combining left-eye and right-eye images.
Figure 7:
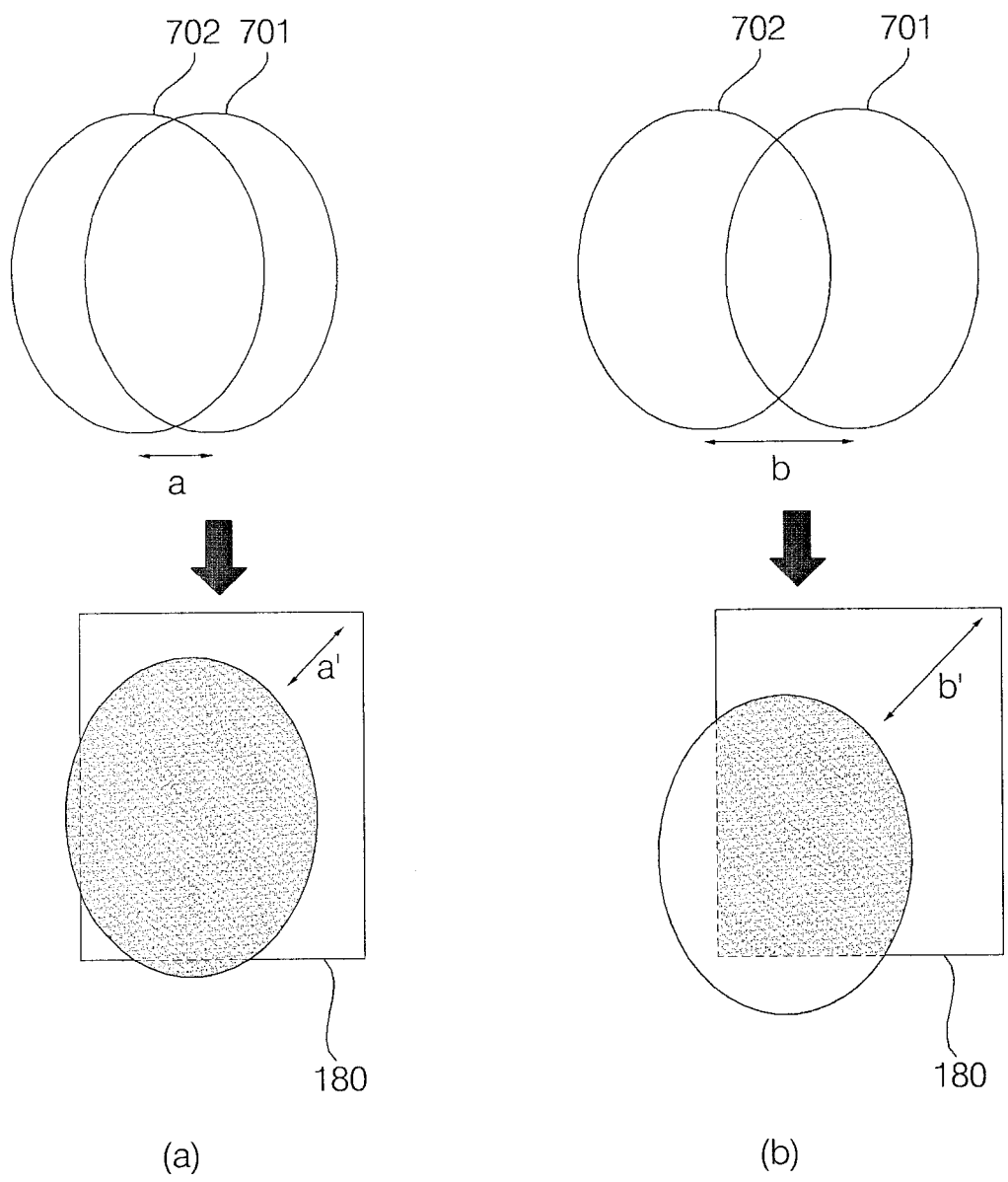
FIGS. 7A and 7B illustrate different depth illusions according to different disparities between a left-eye image and a right-eye image.

FIG. 6 illustrates formation of 3D images by combining left-eye and right-eye images, and FIGS. 7A and 7B illustrate different depth illusions according to different disparities between a left-eye image and a right-eye image.

Referring to FIG. 6, there are a plurality of images or objects 615, 625, 635 and 645. A first object 615 is created by combining a first left-eye image 611 (L1) based on a first left-eye image signal with a first right-eye image 613 (R1) based on a first right-eye image signal, with a disparity d1 between the first left-eye and right-eye images 611 and 163. The user sees an image as formed at the intersection between a line connecting a left eye 601 to the first left-eye image 611 and a line connecting a right eye 603 to the first right-eye image 613. Therefore, the user is tricked into perceiving the first object 615 as behind the display 180.

As a second object 625 is created by overlapping a second left-eye image 621 (L2) with a second right-eye image 623 (R2) on the display 180, thus with a disparity of 0 between the second left-eye and right-eye images 621 and 623. Thus, the user perceives the second object 625 as on the display 180.

A third object 635 is created by combining a third left-eye image 631 (L3) with a third right-eye image 633 (R3), with a disparity d3 between the third left-eye and right-eye images 631 and 633. A fourth object 645 is created by combining a fourth left-eye image 641 (L4) with a fourth right-eye image 643 (R4), with a disparity d4 between the fourth left-eye and right-eye images 641 and 643.

The user perceives the third and fourth objects 635 and 645 at image-formed positions, that is, as being positioned before the display 180.

Because the disparity d4 between the fourth left-eye and right-eye images 641 and 643 is larger than the disparity d3 between the third left-eye and right-eye images 631 and 633, the fourth object 645 appears more protruding than the third object 635.

In exemplary embodiments of the present invention, the distances between the display 180 and the objects 621, 625, 635 and 645 are represented as depths. When an object is perceived to the user as being positioned behind the display 180, the depth of the object is negative-signed. On the other hand, when an object is perceived to the user as being positioned before the display 180, the depth of the object is positive-signed. Therefore, as an object appears more protruding to the user, it is deeper, that is, its depth is larger.

Referring to FIGS. 7A and 7B, the disparity a between a left-eye image 701 and a right-eye image 702 in FIG. 7A is smaller than the disparity b between the left-eye image 701 and the right-eye image 702 in FIG. 7B. Consequently, the depth a' of a 3D object created in FIG. 7A is smaller than the depth b' of a 3D object created in FIG. 7B.

In the case where a left-eye image and a right-eye image are combined to a 3D image, if the left-eye and right-eye images of 3D images are apart from each other by different disparities, the 3D images are perceived to the user as formed at different positions. This means that the depth of a 3D image or object formed by a left-eye image and a right-eye image in combination may be controlled by adjusting the disparity of the left-eye and right-eye images.

Figure 8:
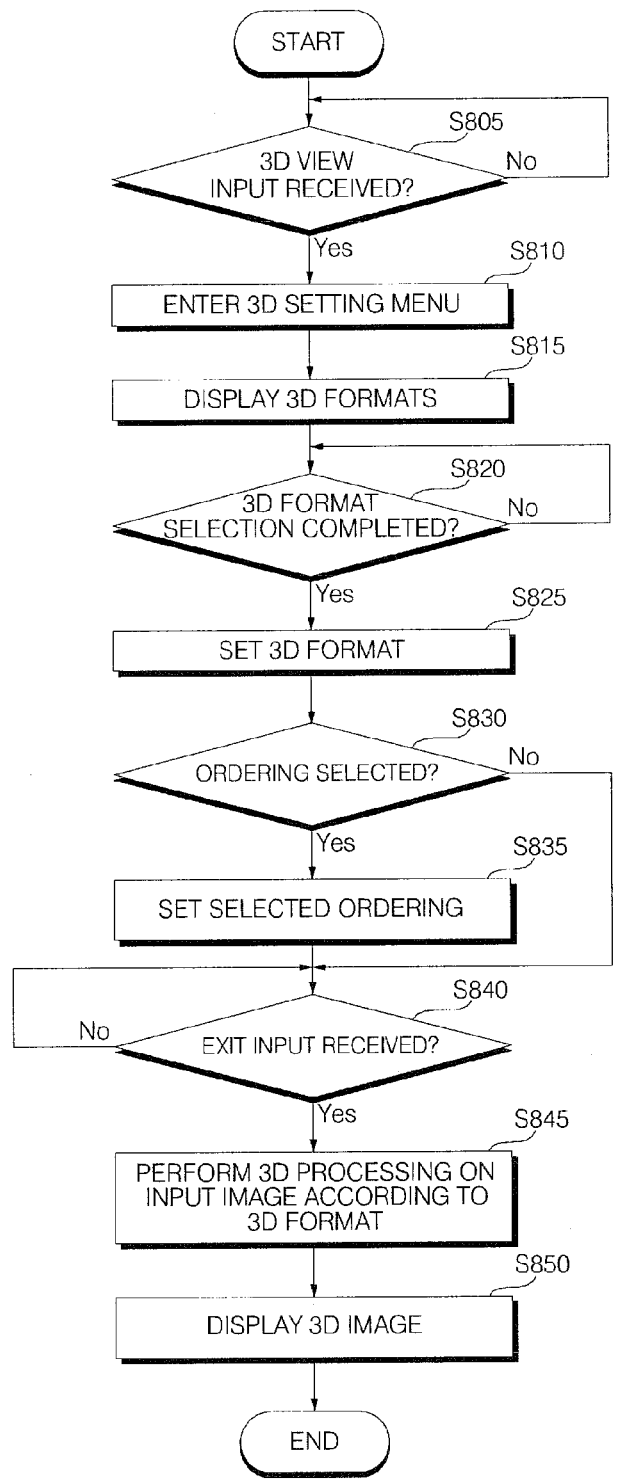
FIG. 8 is a flowchart illustrating a method for operating the image display apparatus according to an exemplary embodiment of the present invention.

FIG. 8 is a flowchart illustrating a method for operating the image display apparatus according to an exemplary embodiment of the present invention, and FIGS. 9 to 31 are views referred to for describing the method for operating the image display apparatus, illustrated in FIG. 8.

Referring to FIG. 8, it is first determined whether a 3D view input has been received in step S805.

Specifically, with an image displayed on the display 180, the controller 170 determines whether a 3D view input has been received.

The image displayed on the display 180 may be an external input image from the external device 190, an image received from a content provider over a network, a broadcast image based on a broadcast signal received from the tuner 110, or an image stored in the storage 140. The image input to the display 180 may be a 2D or 3D image.

The 3D view input may be received through the remote controller or a local key. Also, if the external input image from the external device 190 or the broadcast image is a 3D image, the 3D view input may be automatically issued.

Figure 9:
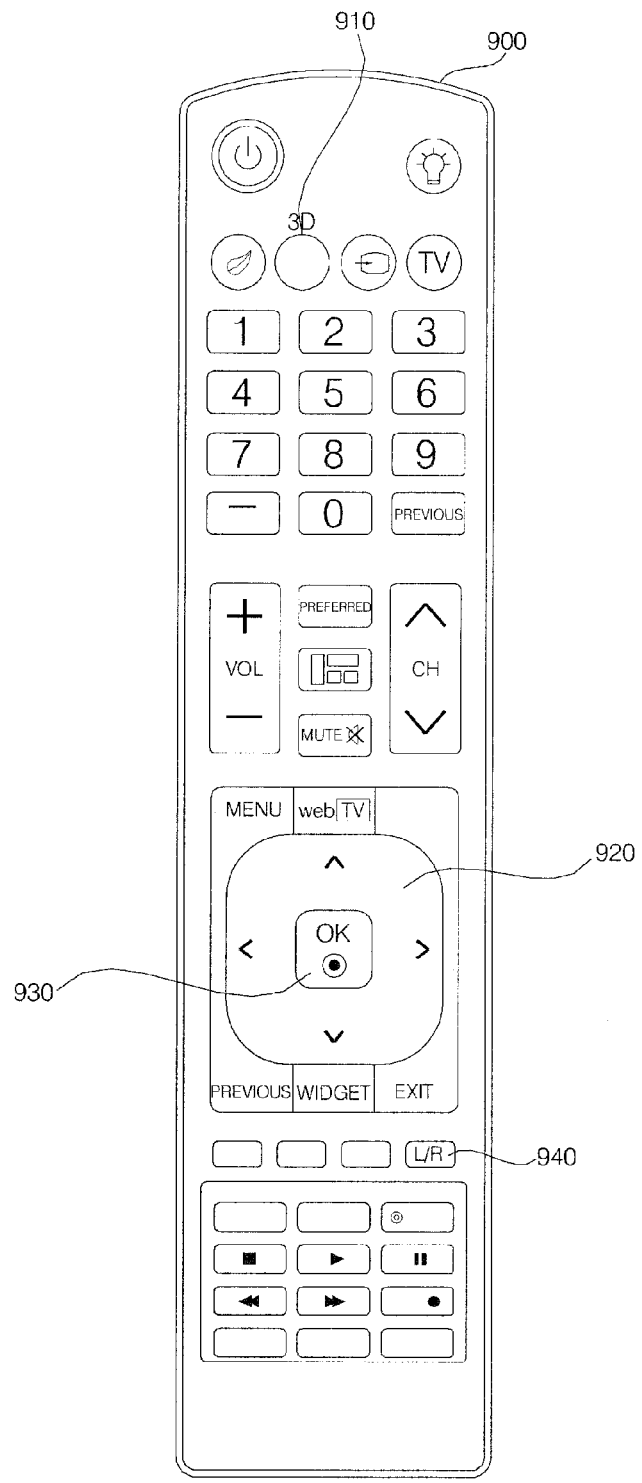
FIGS. 9 to 31 are views referred to for describing the method for operating the image display apparatus, illustrated in FIG. 8.

The remote controller may be configured as illustrated in FIG. 9. Referring to FIG. 9, a remote controller 900 includes a power key, number keys, volume keys, channel keys, etc. The remote controller 900 further includes a 3D key 910, directional keys 920, an OK key 930, and an L/R select key 940.

When the user presses the 3D key 910 of the remote controller 900 during viewing a 2D image, the controller 170 determines that the 3D view input has been received.

If the user manipulates the 3D key 910 during viewing a 3D image, the controller 170 may determine that the 3D view is terminated.

If the display 180 receives a 3D image, it may display an object (not shown) that prompts the user to select whether to enter a 3D display mode or not. When the user selects to enter the 3D display mode, the controller 170 may determine that the 3D view input has been received.

Unlike the configuration of the remote controller 900 illustrated in FIG. 9, the remote controller 900 may be configured such that a pointer (not shown) is displayed on the display 180 in correspondence with up, down, left, right, back and forth movements of the remote controller 900. Thus an intended menu may be set, or a user input or the 3D view input may be generated, by use of the pointer.

Upon receipt of the 3D view input, a 3D setting menu is entered in step S810 and a plurality of 3D formats available in the 3D setting menu are displayed in step S815.

Specifically, upon receipt of the 3D view input, the controller 170 controls the 3D setting menu to be displayed on the display 180. The 3D setting menu may be generated in the OSD generator 240 of the controller 170.

The 3D setting menu may have at least one of a 3D format setting menu or a 3D ordering menu.

Figure 10:
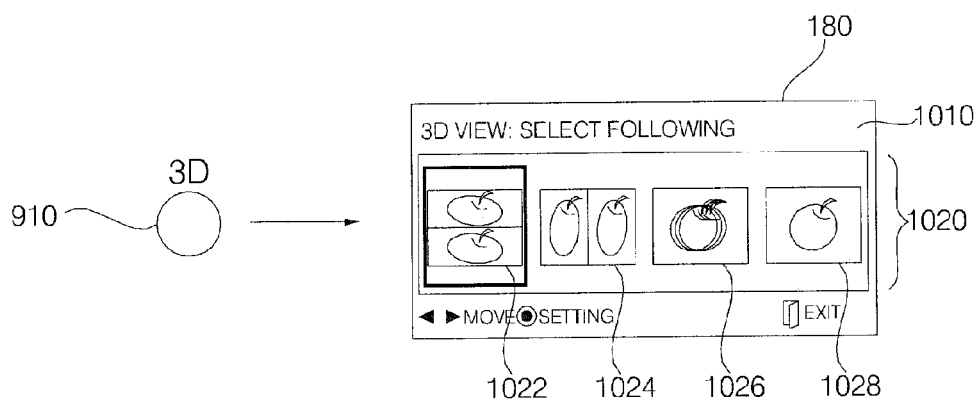

FIG. 10 illustrates a 3D format setting menu 1010 displayed on the display 180 when the 3D key 910 of the remote controller 900 is input.

The 3D format setting menu 1010 may include at least one of an object indicating the side-by-side format (hereinafter, referred to as a side-by-side format object), an object indicating the top/bottom format (hereinafter, referred to as a top/bottom format object), an object indicating the frame sequential format (hereinafter, referred to as a frame sequential format object), an object indicating the interlaced format (hereinafter, referred to as an interlaced format object), or an object indicating the checker box format (hereinafter, referred to as a checker box format object), as object indicating 3D formats.

In FIG. 10, 3D format objects 1020 are shown to include a top/bottom format object 1022, a side-by-side format object 1024, a frame sequential format object 1026, and a checker box format object 1028, and the top/bottom format object 1022 is focused as a default format object, by way of example.

The 3D format objects 1020 may be displayed as two-dimensional (2D) images. Therefore, the user can identify the 3D formats intuitively by the 2D images of the 3D format objects 1020.

While the display 180 displays only the 3D format setting menu 1010 in FIG. 10 for illustrative purposes, to which the present invention is not limited, it may be also contemplated that the 3D format setting menu 1010 overlies on an image (not shown) displayed on the display 180. Specifically, the 3D format setting menu 1010 may be displayed in a pop-up window. When the top/bottom format object 1022 is focused as a default format object, the image may be displayed as a 3D image of the top/bottom format.

Figure 11:
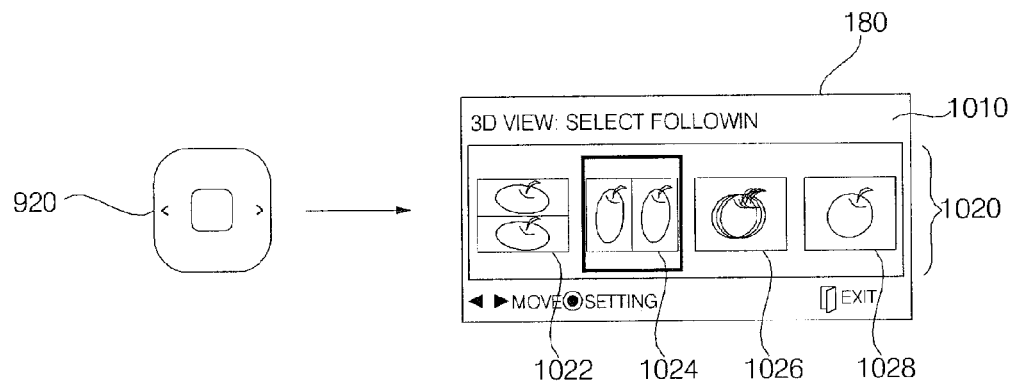

FIG. 11 illustrates scrolling over the 3D format objects by the directional keys 920 of the remote controller 900. The user may move the focus from the top/bottom format object 1022 to the side-by-side format object 1024 by manipulating a right shift key among the directional keys 920 of the remote controller 90.

Meanwhile, if the focus moves to the side-by-side format object 1024 with the 3D format setting menu 1010 overlaid on the on-going image on the display 180, the image may be displayed as a 3D image in the side-by-side format. Thus, the user can intuitively identify the side-by-side format.

It is determined whether a 3D format has been completely selected in step S820 and upon selection of a 3D format, the selected 3D format is set in step S825.

Specifically, with the 3D format setting menu 1010 displayed on the display 180, the controller 170 determines whether a particular 3D format has been selected. For example, when the OK key 930 of the remote controller 900 is pressed or an object confirming a setting displayed on the display 180 is selected, the controller 170 may consider that the particular 3D format has been selected.

Figure 12:
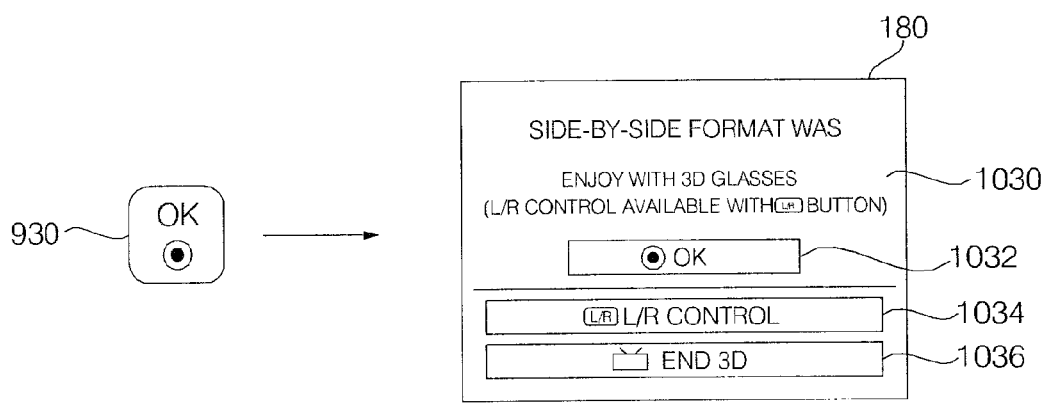

FIG. 12 illustrates setting of the side-by-side format as a 3D format by manipulating the OK key 930 of the remote controller 900. Referring to FIG. 12, a format setting confirmation screen 1030 may include an object 1032 for confirming the format setting, an object 1034 for setting an ordering of left-eye and right-eye images, and an object 1036 for ending the 3D view.

The format setting confirmation screen 1030 may further include a message indicating the 3D format that has been set (i.e. indicating that the side-by-side format has been set) and a message asking for 3D glasses.

Figure 13:
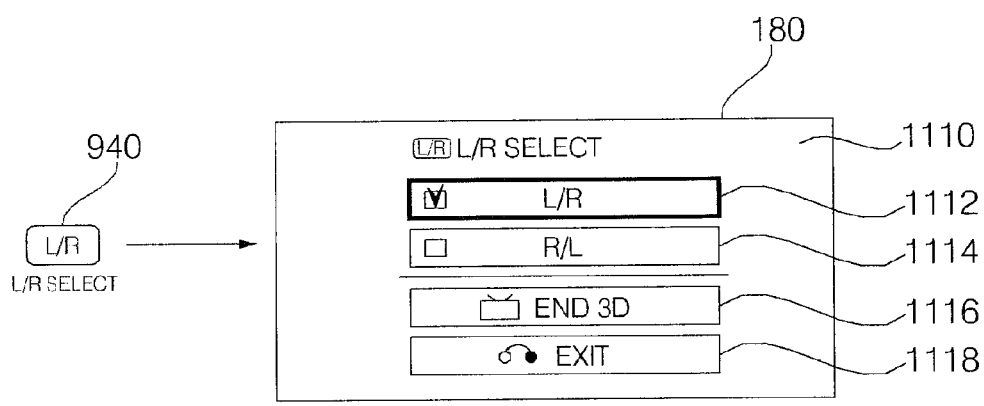

FIG. 13 illustrates a 3D ordering menu 1110 in the 3D setting menu by manipulating the L/R select key 940 of the remote controller 900.

Referring to FIG. 13, the 3D ordering menu 1110 may include a first ordering object (L/R) 1112 indicating a left-eye and then right-eye image ordering (referred to as an L/R ordering), a second ordering object (R/L) 1114 indicating a right-eye and then left-eye image ordering (referred to as an R/L ordering), an object 1116 for ending the 3D view, and an object 1118 indicating exit.

The first ordering object 1112 indicating the L/R ordering is focused as a default in FIG. 13. While the L/R ordering may be set by the focusing, that is, the focusing may suffice for setting the L/R ordering, which should not be construed as limiting the present invention, the L/R ordering may be finally set by manipulation of the OK key 930.

For instance, with the first ordering object (L/R) 1112 focused on the display 180, the user may focus the second ordering object (R/L) 1114 by manipulating a down shift key among the directional keys 920 of the remote controller 900. While the R/L ordering may be set by the focusing, that is, the focusing may suffice for setting the R/L ordering, which should not be construed as limiting the present invention, the R/L ordering may be finally set by manipulation of the OK key 930.

Meanwhile, the 3D ordering menu 1110 may also be entered, when the object 1034 for setting an ordering of left-eye and right-eye images is selected.

While the display 180 displays only the 3D ordering menu 1110 in FIG. 13 for illustrative purposes, it may be further contemplated that the 3D ordering menu 1110 is overlaid on the on-going image displayed on the display 180. When the first ordering object (L/R) 1112 indicating the L/R ordering is focused, the image may be displayed converted to a 3D image created by arranging left-eye and right-eye images according to the L/R ordering. The 3D ordering menu 1110 may be overlaid on the image, in the form of a pop-up window.

Figure 14:
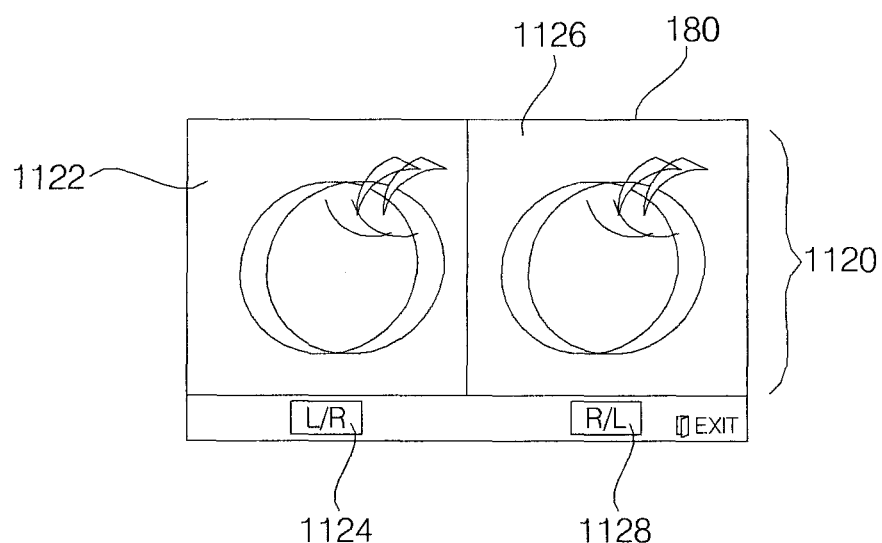

FIG. 14 illustrates another exemplary 3D ordering menu in the 3D setting menu.

Referring to FIG. 14, the 3D ordering menu may include a first ordering object (L/R) 1124 indicating the L/R ordering, and a second ordering object (R/L) 1128 indicating the R/L ordering.

It is assumed herein that the side-by-side format has been set. In FIG. 14, the first and second ordering objects 1124 and 1128 are disposed side by side in a lower part of the display 180, and a 3D image 1120 is displayed, including a 3D image 1122 displayed in the L/R ordering indicated by the first ordering object 1124 above the first ordering object 1124 and a 3D image 1126 displayed in the R/L ordering indicated by the second ordering object 1128 above the second ordering object 1128.

The image 1120 is a preview 3D image. As the 3D images 1122 and 1126 are displayed according to a plurality of left-eye and right-eye image orderings in the 3D image 1120, the user can intuitively select an appropriate ordering.

For example, the user may focus the second ordering object (R/L) 1128 by manipulating the right shift key among the directional keys 920 of the remote controller 900, with the first ordering object (L/R) 1124 focused on the display 180. While the R/L ordering may be set by the focusing, that is, the focusing may suffice for setting the R/L ordering, which should not be construed as limiting the present invention, the R/L ordering may be finally set by manipulation of the OK key 930.

As a 3D image is displayed according to a selected left-eye and right-eye image ordering on the display 180, the user can intuitively set an appropriate ordering of left-eye and right-eye images.

Figure 15:
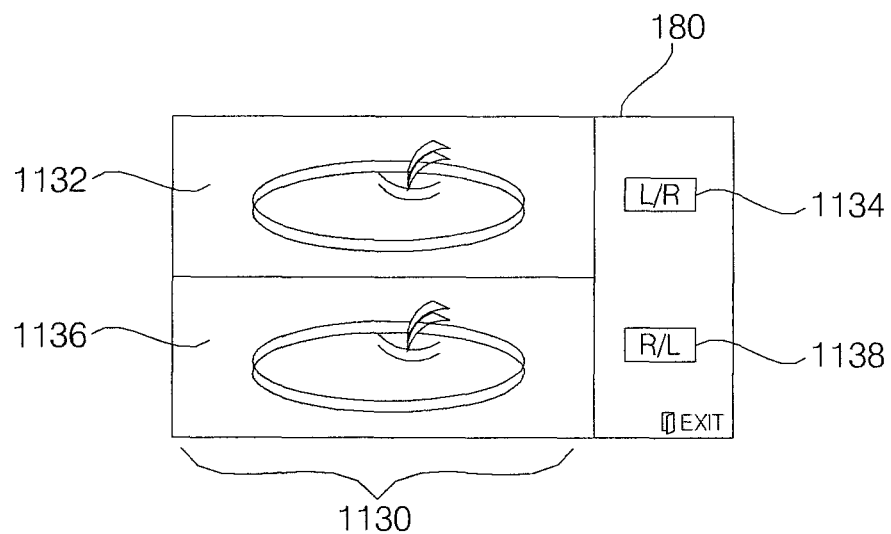

FIG. 15 illustrates a further example of the 3D ordering menu. The 3D ordering menus illustrated in FIGS. 14 and 15 are similar but differ in that the 3D ordering menu of FIG. 15 is for the case of the top/bottom format. Referring to FIG. 15, a first ordering object (L/R) 1134 and a second ordering object (R/L) 1138 are arranged vertically in a right part of the display 180, and a 3D image 1130 is displayed, including a 3D image 1132 displayed in the L/R ordering indicated by the first ordering object (L/R) 1134 on the left of the first ordering object (L/R) 1134 and a 3D image 1136 displayed in the R/L ordering indicated by the second ordering object (R/L) 1138 on the left of the second ordering object (R/L) 1138.

For example, the user may focus the second ordering object (R/L) 1138 by manipulating the down shift key among the directional keys 920 of the remote controller 900, with the first ordering object (L/R) 1134 focused. While the R/L ordering may be set by the focusing, that is, the focusing may suffice for setting the R/L ordering, which should not be construed as limiting the present invention, the R/L ordering may be finally set by manipulation of the OK key 930.

It is determined whether an ordering setting input has been received in step S830 and upon receipt of the ordering setting input, a left-eye and right-eye image ordering corresponding to the ordering setting input is set in step S835.

Specifically, the controller 170 determines whether an ordering setting input has been received by monitoring the L/R select key 940, the directional keys 920, and the OK key 930 and upon receipt of the ordering setting input, sets a left-eye and right-eye image ordering corresponding to the ordering setting input.

Referring to FIG. 13, when the down shift key among the directional keys 920 of the remote controller 920 is input with the first ordering object 1112 indicating the L/R ordering, the second ordering object 1114 indicating the R/L ordering may be focused. Then when the OK key 930 is manipulated, the second ordering object 1114 may be selected.

Accordingly, the controller 170 may render a 3D image by placing its right-eye image before its left-eye image. As described before with reference to FIG. 11, if the side-by-side format has been selected, the right-eye image is placed on the left and the left-eye image is placed on the right.

In step S840, it is determined whether an input to exit from the 3D setting menu has been received in step S840 and upon receipt of the exit input, an image is processed to a 3D image according to the selected 3D format or ordering in step S845. In step S850, the 3D image is displayed on the display 180.

Specifically, upon selection of an object indicating exit with the 3D setting menu displayed on the display 180, as illustrated in FIG. 10 or 11, the controller 170 discontinues to display the 3D setting menu, processes an input image to a 3D image according to the set 3D format or ordering, and controls the processed 3D image on the display 180.

Upon selection of the object 1118 indicating exit with the 3D setting menu displayed on the display 180, as illustrated in FIG. 13, the controller 170 discontinues to display the 3D setting menu, processes an input image to a 3D image according to the set 3D format or ordering, and controls the processed 3D image on the display 180.

For example, if an input broadcast image or an external input image is a 3D image, the controller 170 arranges a right-eye image on the left and a left-eye image on the right in the side-by-side format that has been set and controls the 3D image of the left-eye and right-eye images to be displayed on the display 180.

If the input broadcast image or the external input image is a 2D image, the controller 170 detects an object from the 2D image and generates left-eye and right-eye images according to the depth of the object, arranges the right-eye image on the left and the left-eye image on the right in the side-by-side format that has been set and controls the 3D image of the left-eye and right-eye images to be displayed on the display 180.

Figure 16:
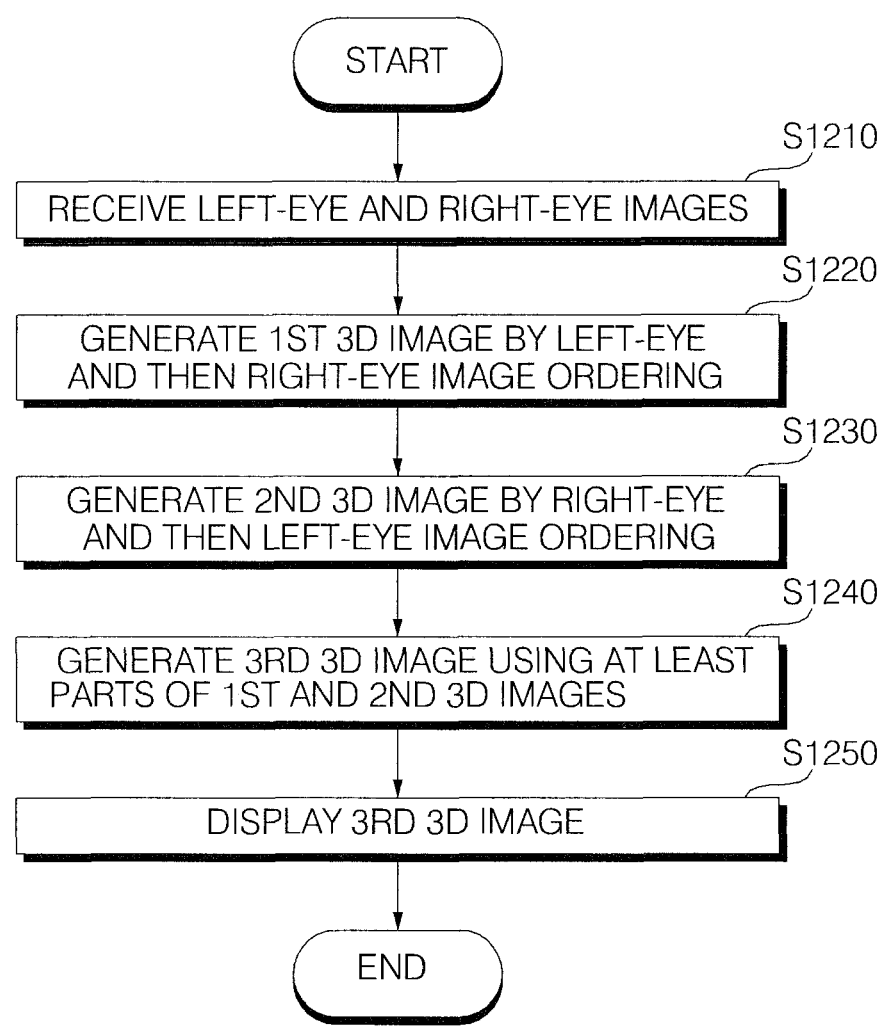

FIG. 16 is a flowchart illustrating an operation for displaying a 3D image based on the L/R ordering indicated by the first ordering object illustrated in FIG. 14 or 15 along with a 3D image based on the R/L ordering indicated by the second ordering object illustrated in FIG. 14 or 15.

Referring to FIG. 16, a right-eye image and a left-eye image are received in step S1210. Specifically, the controller 170, especially the formatter 260 separates the left-eye and right-eye images from an input image.

For instance, when the input image includes multi-view images, especially left-eye and right-eye images, the left-eye and right-eye images are simply received.

If the input image includes a color image and a depth image, left-eye and right-eye images are created from the color image and the depth image.

If the input image is a 2D image, an object is detected from the 2D image by a detection technique and the motion of the object is detected on a frame basis, thus setting a depth for the object. Then left-eye and right-eye images of the object are generated separately according to the depth.

In step S1220, a first 3D image is created by arranging the left-eye image and then the right-eye image. Specifically, the controller 170, especially the formatter 260 generates the first 3D image in which the left-eye image first and then the right-eye image are arranged according to a 3D format that has been set.

In step S1230, a second 3D image is created by arranging the right-eye image and then the left-eye image. Specifically, the controller 170, especially the formatter 260 generates the second 3D image in which the right-eye image first and then the left-eye image are arranged according to the 3D format.

Subsequently, a third 3D image is created by combining at least part of the first 3D image with at least part of the second 3D image in step S1240 and displayed on the display 180 in step S1250.

To be specific, the controller 170, particularly the formatter 260 generates the third 3D image using the first and second 3D images and displays the third 3D image on the display 180.

Figure 17:
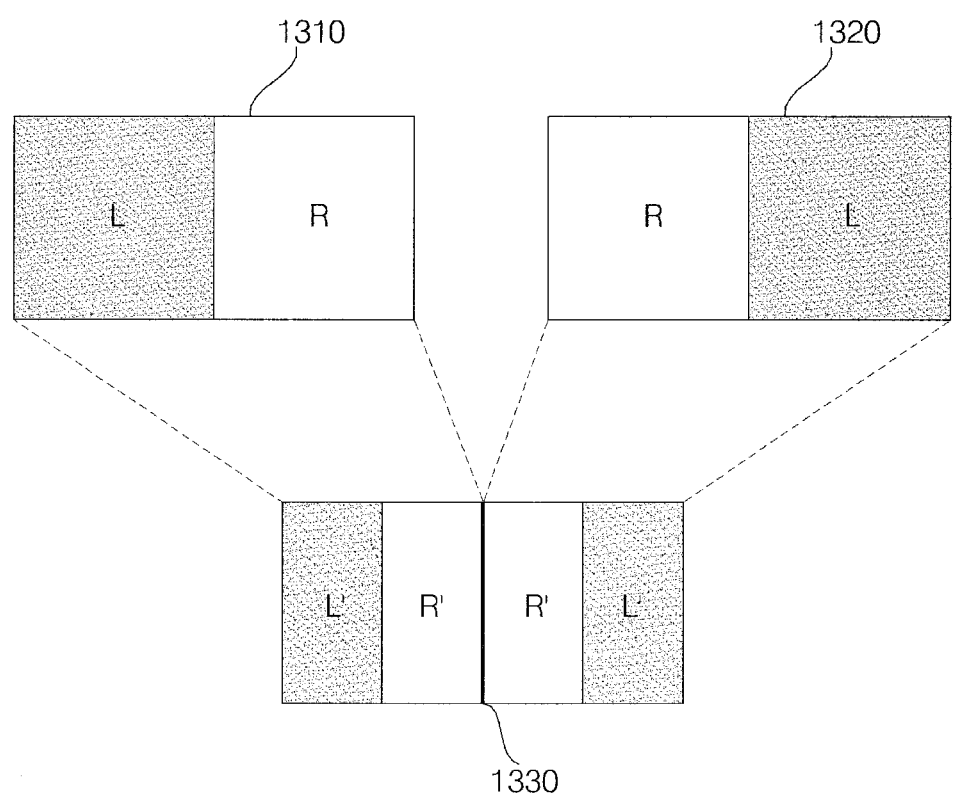
Figure 18:
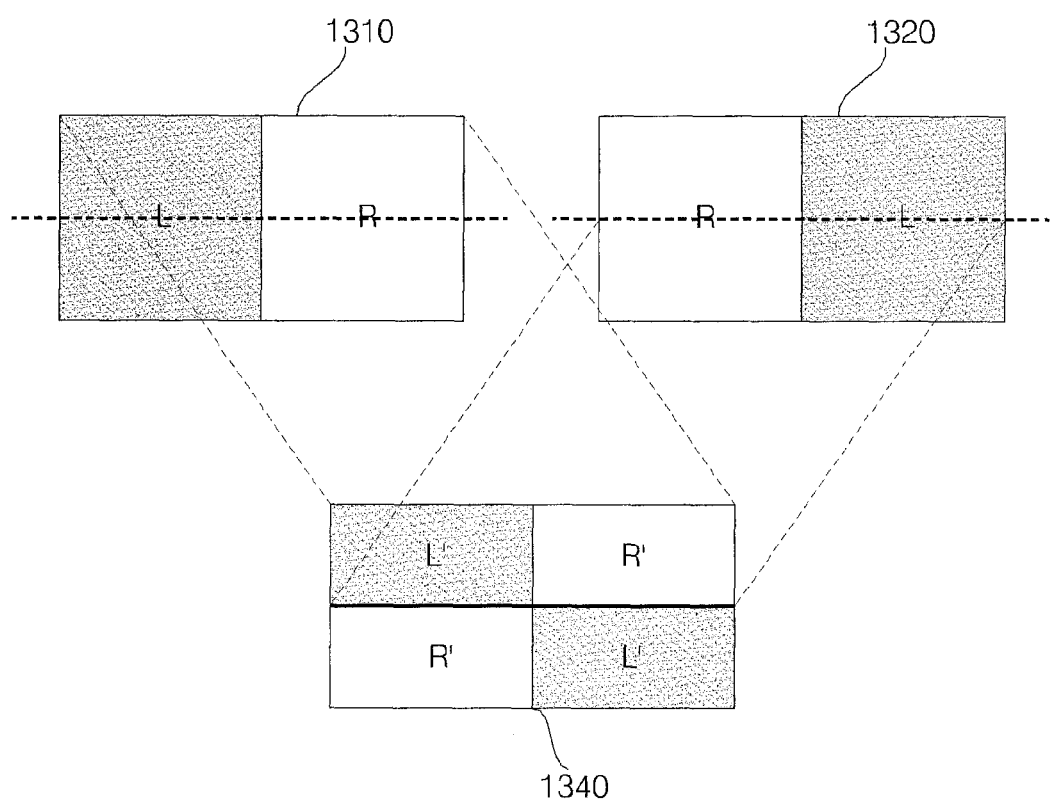
Figure 19:
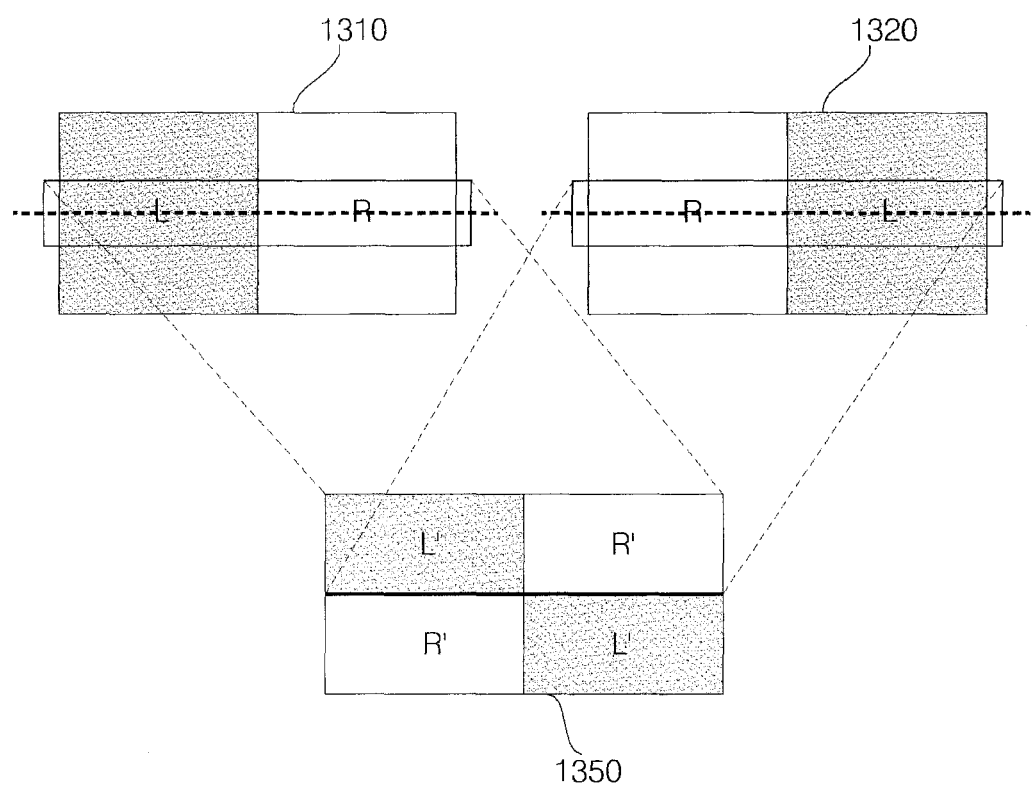

FIGS. 17 to 25 illustrate exemplary third 3D images generated according to different 3D formats. Specifically, FIGS. 17, 18 and 19 illustrate operations for generating third 3D images in the side-by-side format.

Referring to FIG. 17, a first 3D image 1310 with a left-eye image on the left and a right-eye image on the right is combined with a second 3D image 1320 with the right-eye image on the left and the left-eye image on the right, in the side-by-side format.

A third 3D image 1330 results from scaling down the first and second 3D images 1310 and 1320 and combining the scaled-down first and second 3D images 1310 and 1320. The third 3D image 1330 may be displayed on the display 180 and the user may select an appropriate left-eye and right-eye image ordering, when the user sees the 3D image 1330 with polarized glasses or shutter glasses that are open in both lenses. Hence, user convenience can be increased.

Referring to FIG. 18, compared to the third image 1330 illustrated in FIG. 17, a third 3D image 1340 is created by extracting or cropping a part (an upper part) of the first 3D image 1310 and a part (a lower part) of the second 3D image 1320 and combining the extracted or cropped first and second 3D images 1310 and 1320.

Referring to FIG. 19, compared to the third image 1340 illustrated in FIG. 18, a third 3D image 1350 is created by extracting or cropping a part (a middle part) of the first 3D image 1310 and a part (a middle part) of the second 3D image 1320, scaling up the extracted or cropped parts of the first and second 3D images 1310 and 1320, and combining the scaled-up parts of the first and second 3D images 1310 and 1320.

Figure 20:
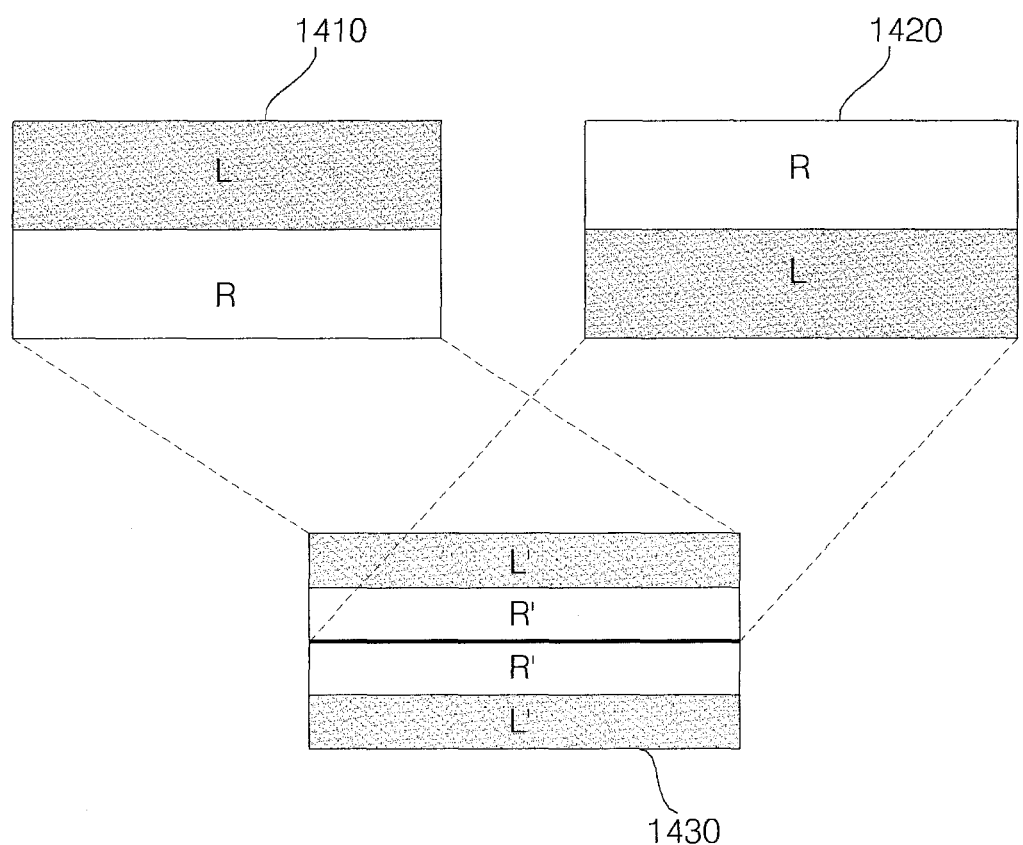
Figure 21:
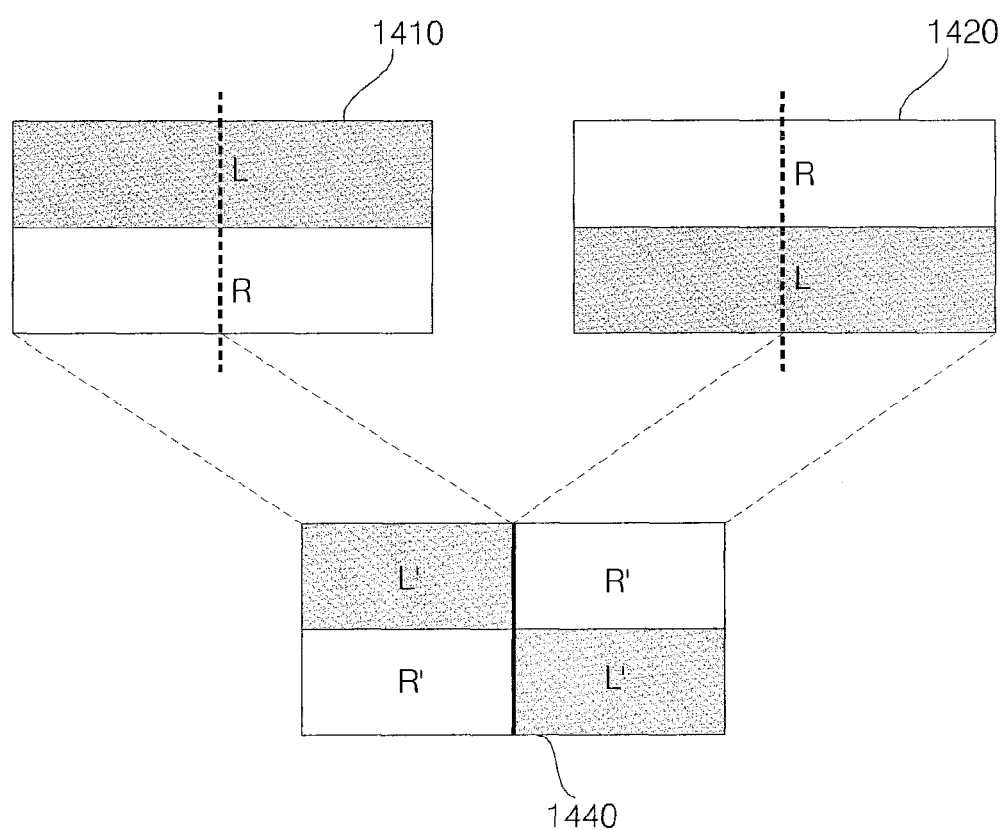
Figure 22:
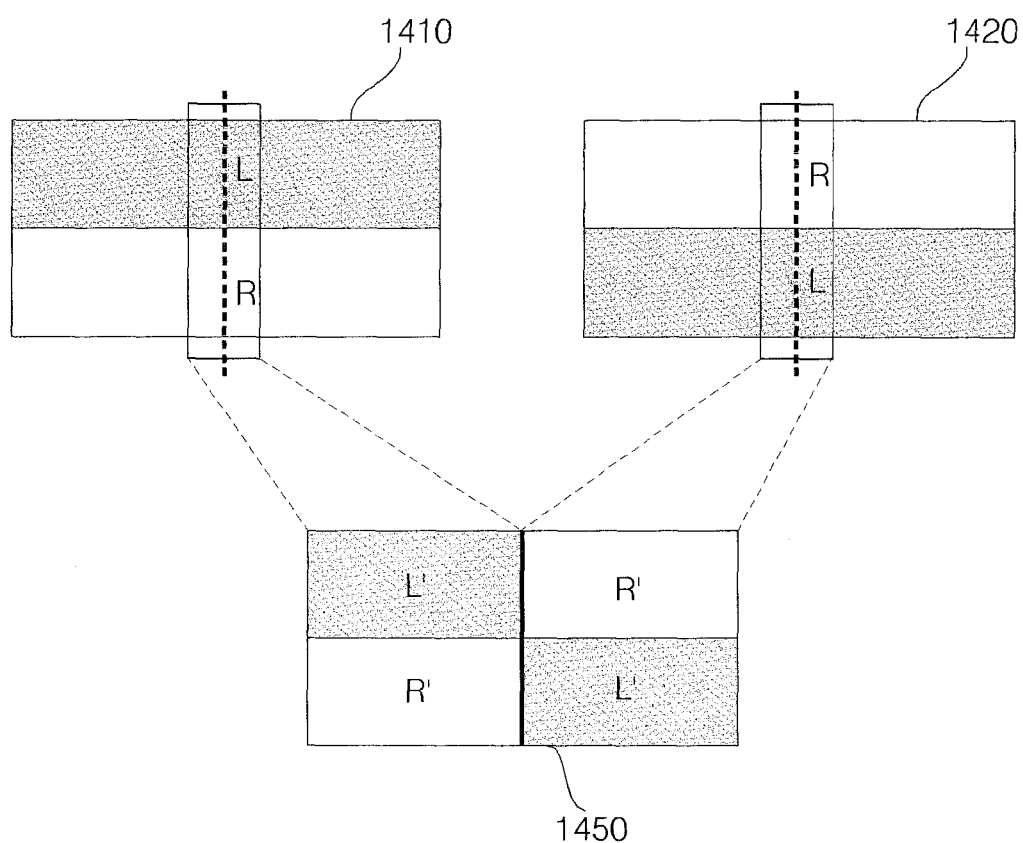

FIGS. 20, 21 and 22 illustrate operations for generating third 3D images in the top/bottom format.

Referring to FIG. 20, a first 3D image 1410 with a left-eye image on top and a right-eye image on bottom is combined with a second 3D image 1420 with the right-eye image on top and the left-eye image on bottom, in the top/bottom format.

A third 3D image 1430 results from scaling down the first and second 3D images 1410 and 1420 and combining the scaled-down first and second 3D images 1410 and 1420. The third 3D image 1430 may be displayed on the display 180 and the user may select an appropriate left-eye and right-eye image ordering, when the user sees the third 3D image 1430 with polarized glasses or shutter glasses that are open in both lenses. Hence, user convenience can be increased.

Referring to FIG. 21, compared to the third image 1430 illustrated in FIG. 20, a third 3D image 1440 is created by extracting or cropping a part (a left part) of the first 3D image 1410 and a part (a right part) of the second 3D image 1420 and combining the extracted or cropped first and second 3D images 1410 and 1420.

Referring to FIG. 22, compared to the third image 1440 illustrated in FIG. 21, a third 3D image 1450 is created by extracting or cropping a part (a middle part) of the first 3D image 1410 and a part (a middle part) of the second 3D image 1420, scaling up the extracted or cropped parts of the first and second 3D images 1410 and 1420, and combining the scaled-up parts of the first and second 3D images 1410 and 1420.

Figure 23:
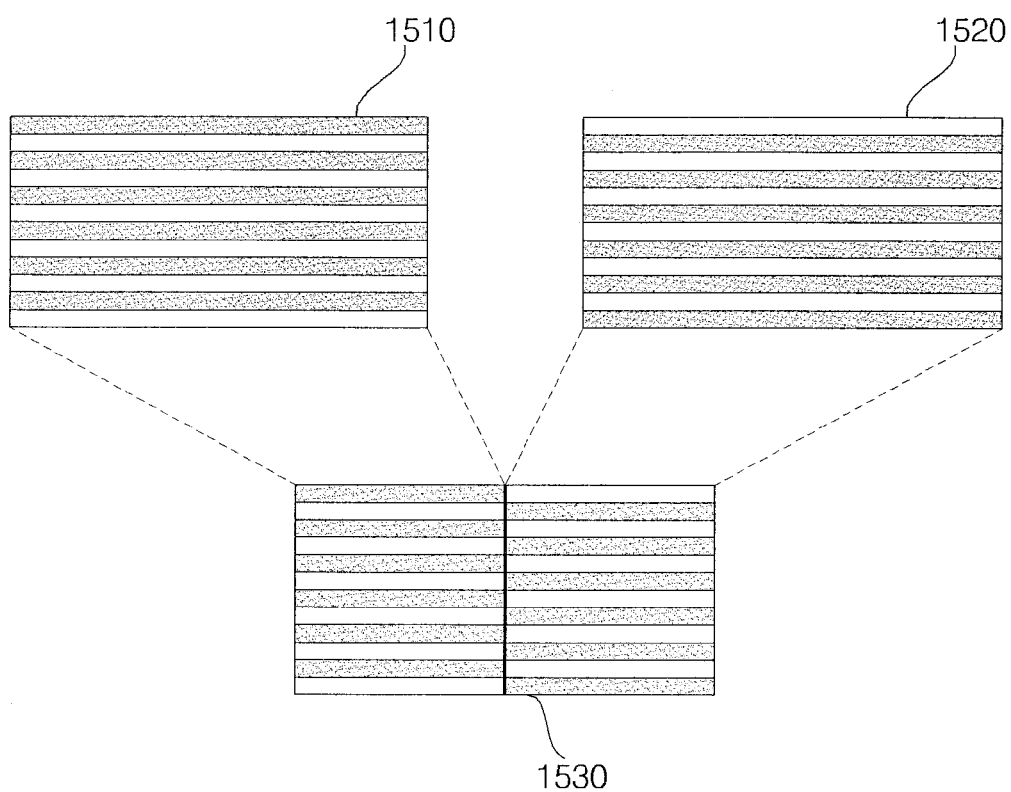
Figure 24:
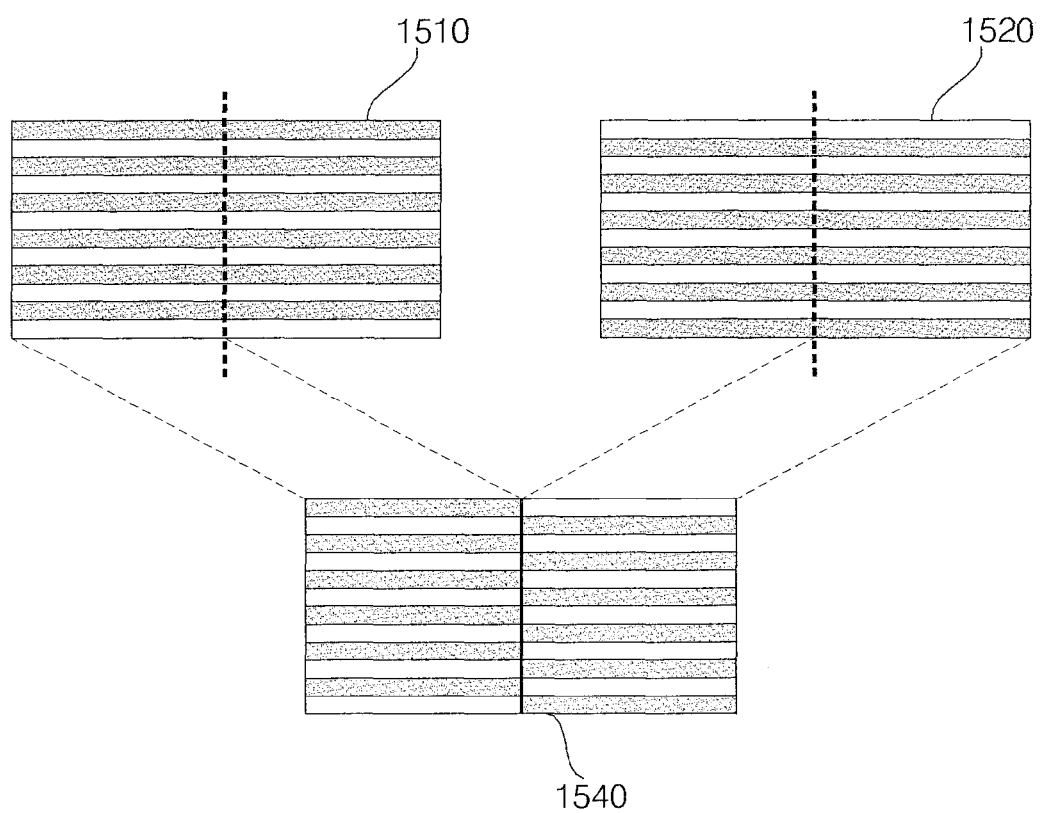
Figure 25:
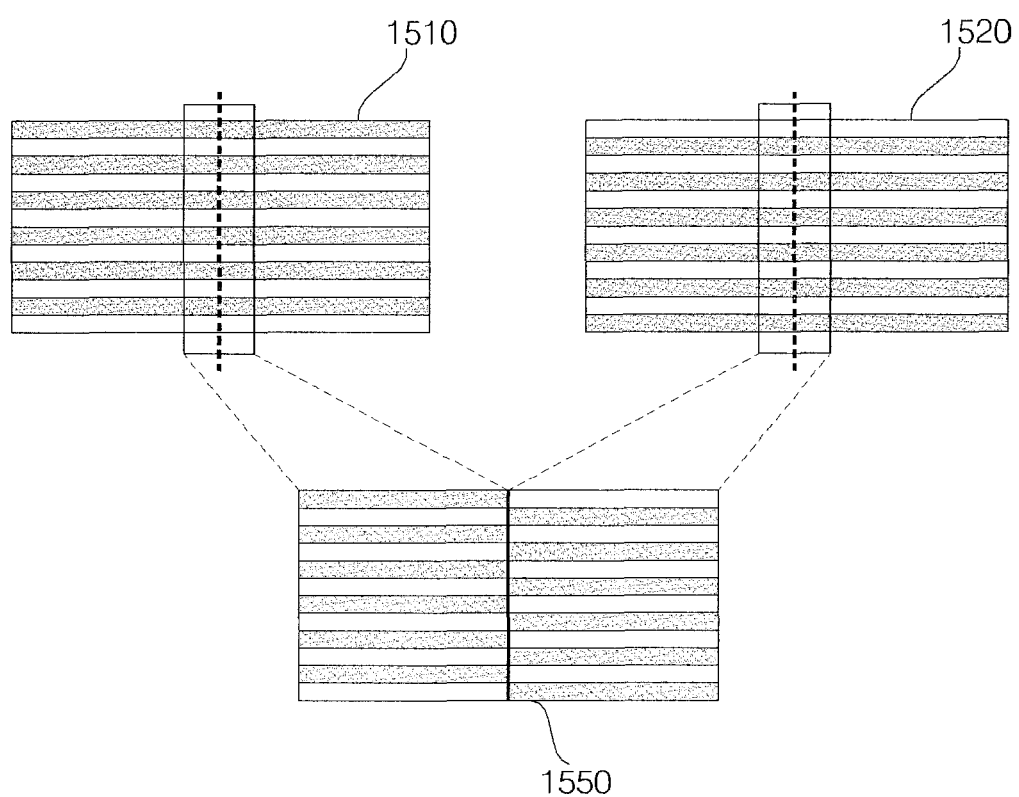

FIGS. 23, 24 and 25 illustrate operations for generating third 3D images in the interlaced format.

Referring to FIG. 23, a first 3D image 1510 with a left-eye image and a right-eye image alternating line by line, starting with the left-eye image, is combined with a second 3D image 1520 with the right-eye image and the left-eye image alternating line by line, starting with the right-eye image, in the interlaced format.

A third 3D image 1530 results from scaling down the first and second 3D images 1510 and 1520 and combining the scaled-down first and second 3D images 1510 and 1520. The third 3D image 1530 may be displayed on the display 180 and the user may select an appropriate left-eye and right-eye image ordering when the user sees the third 3D image 1530 with polarized glasses or shutter glasses that are open in both lenses. Hence, user convenience can be increased.

Referring to FIG. 24, compared to the third image 1530 illustrated in FIG. 20, a third 3D image 1540 is created by extracting or cropping a part (a left part) of the first 3D image 1510 and a part (a right part) of the second 3D image 1520 and combining the extracted or cropped first and second 3D images 1510 and 1520.

Referring to FIG. 25, compared to the third image 1540 illustrated in FIG. 24, a third 3D image 1550 is created by extracting or cropping a part (a middle part) of the first 3D image 1510 and a part (a middle part) of the second 3D image 1520, scaling up the extracted or cropped parts of the first and second 3D images 510 and 520, and combining the scaled-up first and second 3D images 1510 and 1520.

FIGS. 26 to 31 illustrate various examples of the 3D setting menu.

Figure 26:
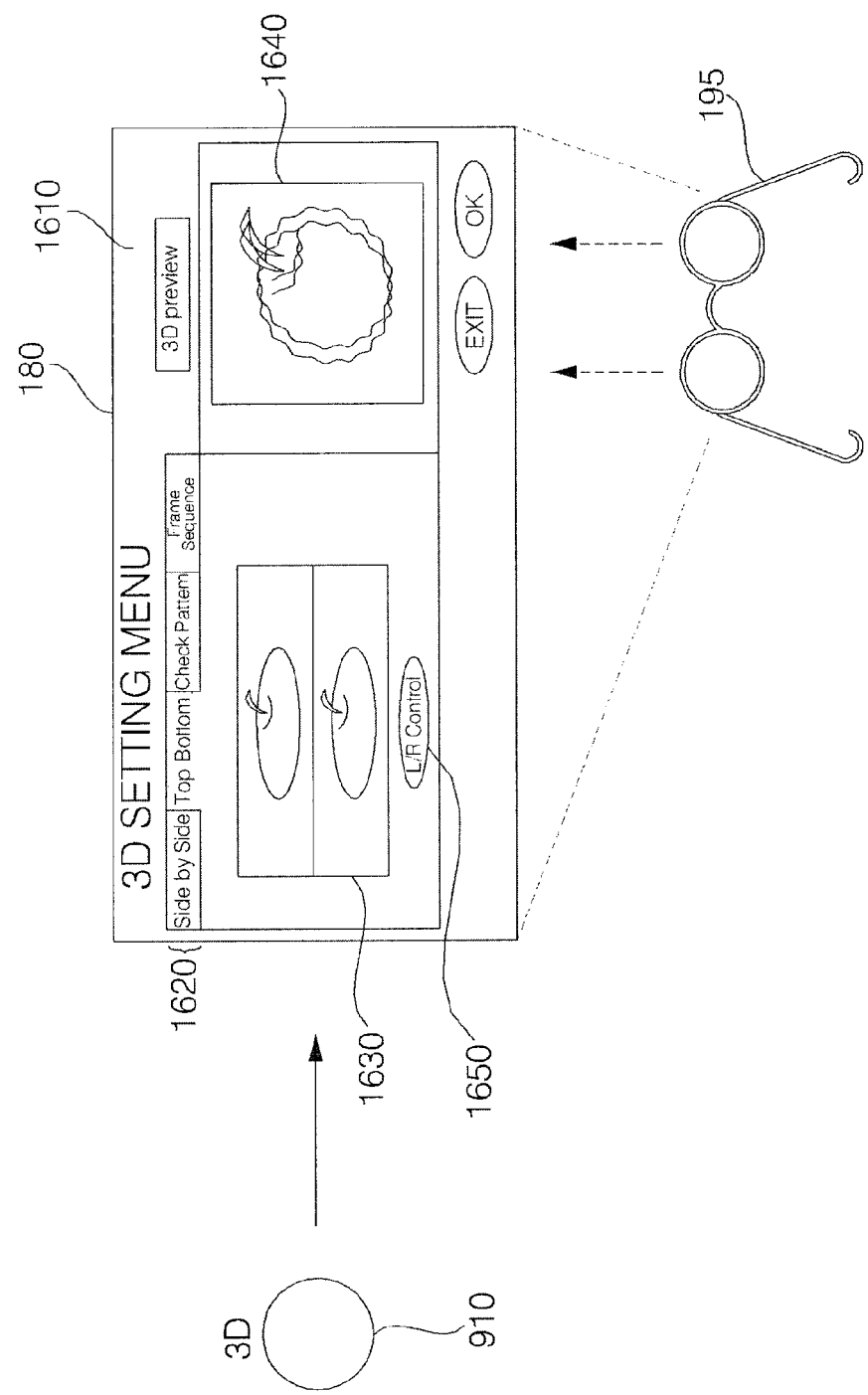

Referring to FIG. 26, a 3D setting menu 1610 is displayed along with a 3D image 1640 set by the 3D setting menu 1610 on the display 180 by manipulation of the 3D key 910 of the remote controller 900.

The 3D setting menu 1610 may include an object area 1620 for selecting one of a plurality of 3D formats, an object 1630 indicating a selected 3D format, and an object 1650 for setting a left-eye and right-eye image ordering.

The object area 1620 may take the form of tab menus. A 3D format selected from the object area 1620 may be displayed focused.

In FIG. 26, the top/bottom format is selected as a default in the object area 1620 and the object 1630 indicates the top/bottom format. The 3D image 1640 is displayed as a preview in the top/bottom format, by way of example.

The object 1630 indicating the top/bottom format may be displayed as a 2D image, whereas the image 1640 may be displayed as a 3D preview image.

Whenever the object 1650 for setting a left-eye and right-eye image ordering is selected, a first 3D image formed by ordering a left-eye image first and then a right-eye image may be displayed alternately with a second 3D image formed by ordering the right-eye image first and then the left-eye image. That is, the first 3D image may be toggled with the second 3D image.

If the 3D image 1640 of the top/bottom format is displayed as a preview despite input of a 3D image of the side-by-side format, the user is easily aware that the 3D image 1640 is not appropriate, wearing the 3D glasses 195, because the 3D format of the input image is different from the set 3D format.

Figure 27:
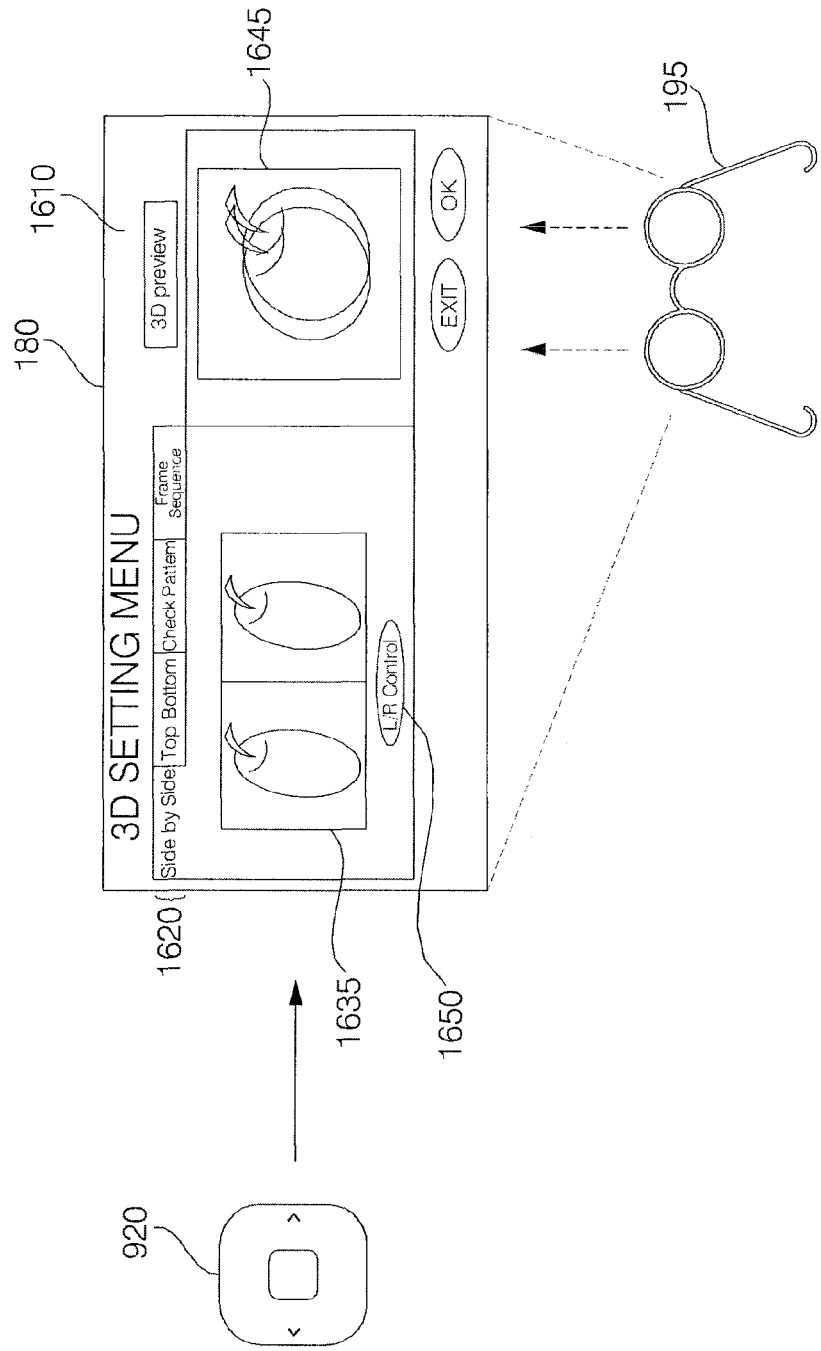

FIG. 27 illustrates shifted focusing to another 3D format by manipulation of the directional keys 920 of the remote controller 900. It is noted from FIG. 27 that the focusing shifts from the top/bottom format to the side-by-side format by the left shift key among the directional keys 920 of the remote controller 900.

Thus an object 1635 indicating the side-by-side format is displayed and a 3D image 1645 is displayed as a preview in the side-by-side format.

When the 3D image 1645 of the side-by-side format is displayed with a 3D image of the side-by-side format input to the display 180, the user wearing the 3D glasses 195 is aware easily that the 3D image 1645 is appropriate due to the identical 3D format of the input image and the 3D image 1645.

Figure 28:
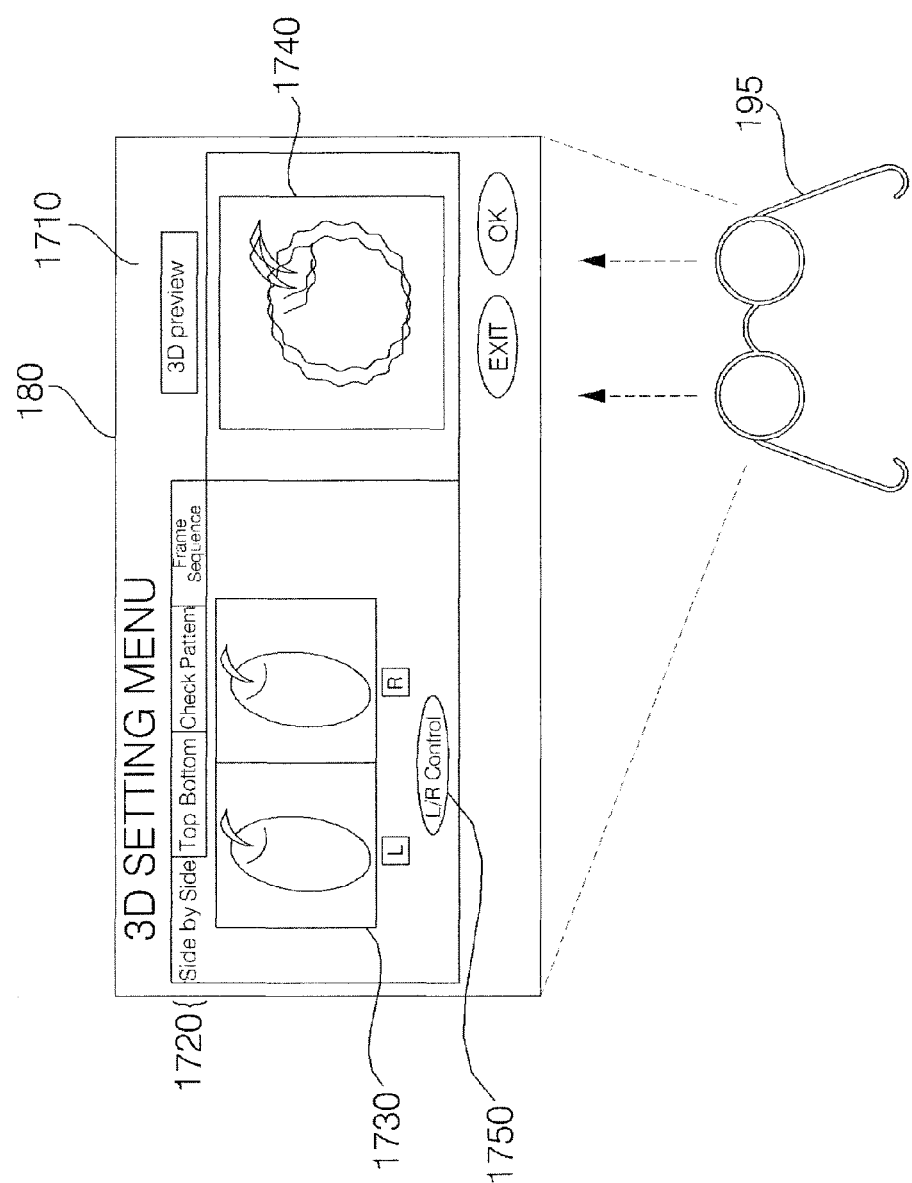

Referring to FIG. 28, the side-by-side format is focused in an object area 1720 of a 3D setting menu 1710 and thus an object 1730 indicating the side-by-side format is displayed.

An object 1750 for setting a left-eye and right-eye image ordering indicates a first ordering being the L/R ordering as a default. Hence, a 3D image 1740 is displayed as a preview according to the side-by-side format and the L/R ordering.

If the 3D image 1740 is displayed as a preview according to the side-by-side format and the L/R ordering, despite input of a 3D image with an R/L ordering in the side-by-side format, the user wearing the 3D glasses 195 is easily aware that the 3D image 1740 is not appropriate because the input 3D image and the 3D image 1740 are identical in 3D format but different in ordering.

Figure 29:
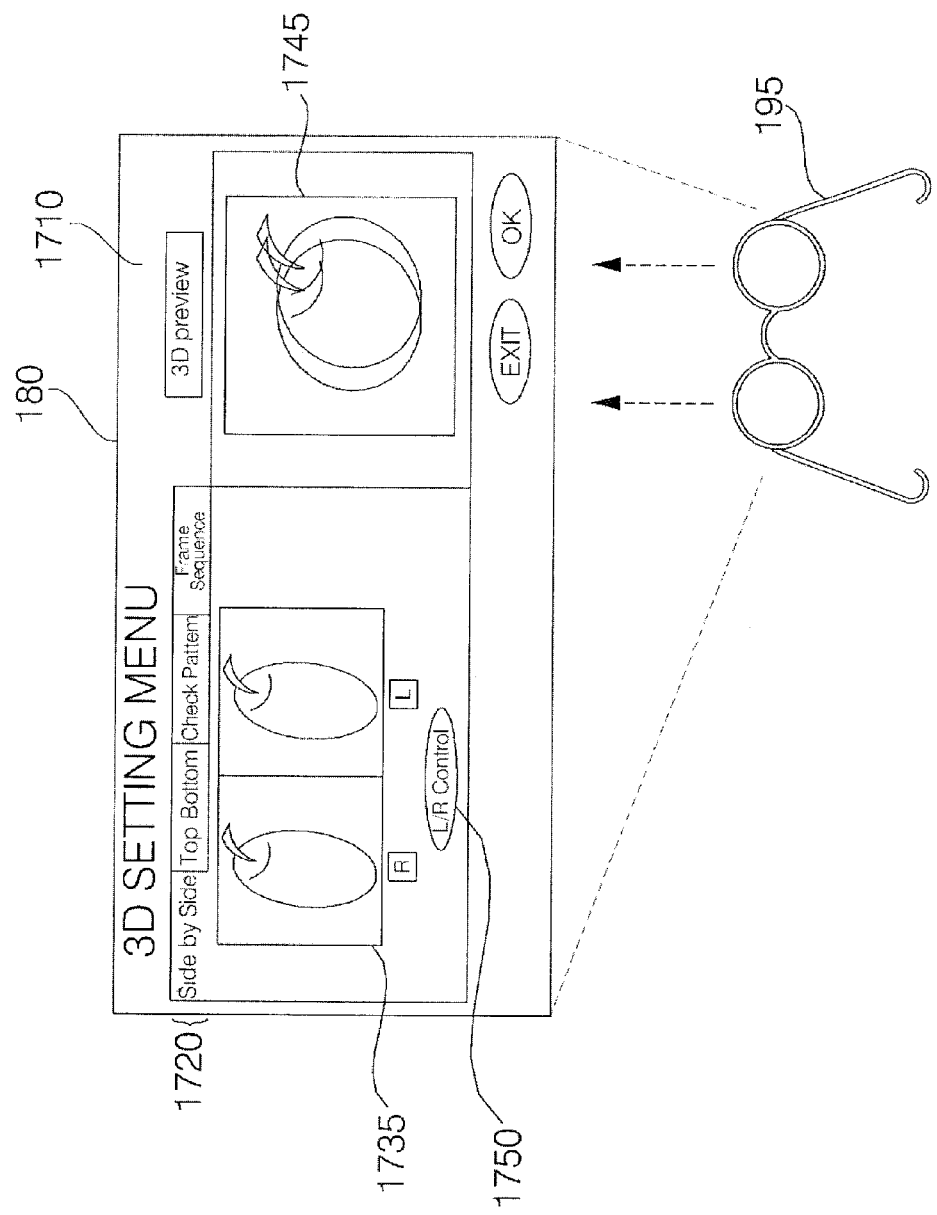

Referring to FIG. 29, the side-by-side format is focused in the object area 1720 of the 3D setting menu 1710 and thus an object 1735 indicating the side-by-side format is displayed.

The object 1750 for setting a left-eye and right-eye image ordering is set to indicate a second ordering being the R/L ordering. Hence, a 3D image 1745 is displayed as a preview according to the side-by-side format and the R/L ordering.

If the 3D image 1745 is displayed as a preview according to the side-by-side format and the R/L ordering, with a 3D image with the R/L ordering input to the display 180 in the side-by-side format, the user wearing the 3D glasses 195 is easily aware that the 3D image 1745 is appropriate. In this manner, the user can set a 3D format and a left-eye and right-eye image ordering for an input image.

Figure 30:
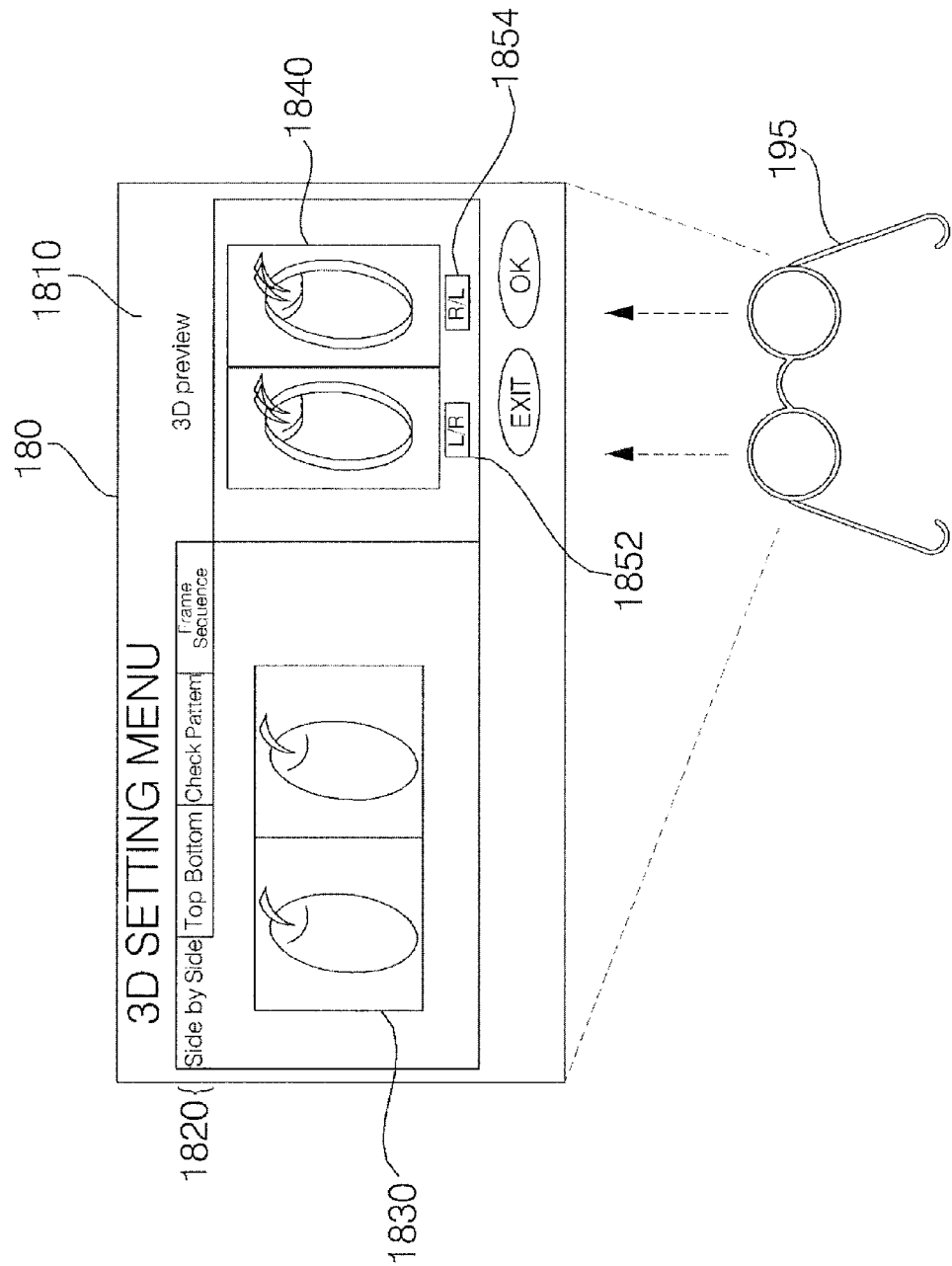

FIG. 30 illustrates a 3D setting menu 1810 displayed along with a 3D image 1840 set by the 3D setting menu 1810 on the display 180, like FIG. 26.

The 3D setting menu 1810 may include an object area 1820 for selecting one of a plurality of 3D formats and an object 1830 indicating the selected 3D format.

The object area 1820 may take the form of tab menus, and a 3D format selected from the object area 1820 may be displayed focused.

In FIG. 30, the side-by-side format is selected from the object area 1820 and the object 1830 indicates the side-by-side format. The 3D image 1840 is displayed as a preview in the side-by-side format.

The 3D image 1840 may include a first 3D image formed by the L/R ordering and a second 3D image formed by the R/L ordering. Because the first 3D image and the second 3D image are displayed together, the user wearing the 3D glasses 195 can select an appropriate left-eye and right-eye image ordering for an input image. That is, a 3D format and an ordering are simply set for an input image.

It is also possible to change a 3D image displayed in a preview area according to a selected 3D format. In this manner, the user can identify both the 3D format and the left-eye and right-eye image ordering at the same time.

To allow the user easily identify orderings, a first ordering object 1852 indicating the L/R ordering and a second ordering object 1854 indicating the R/L ordering may be displayed under the 3D image 1840.

Figure 31:
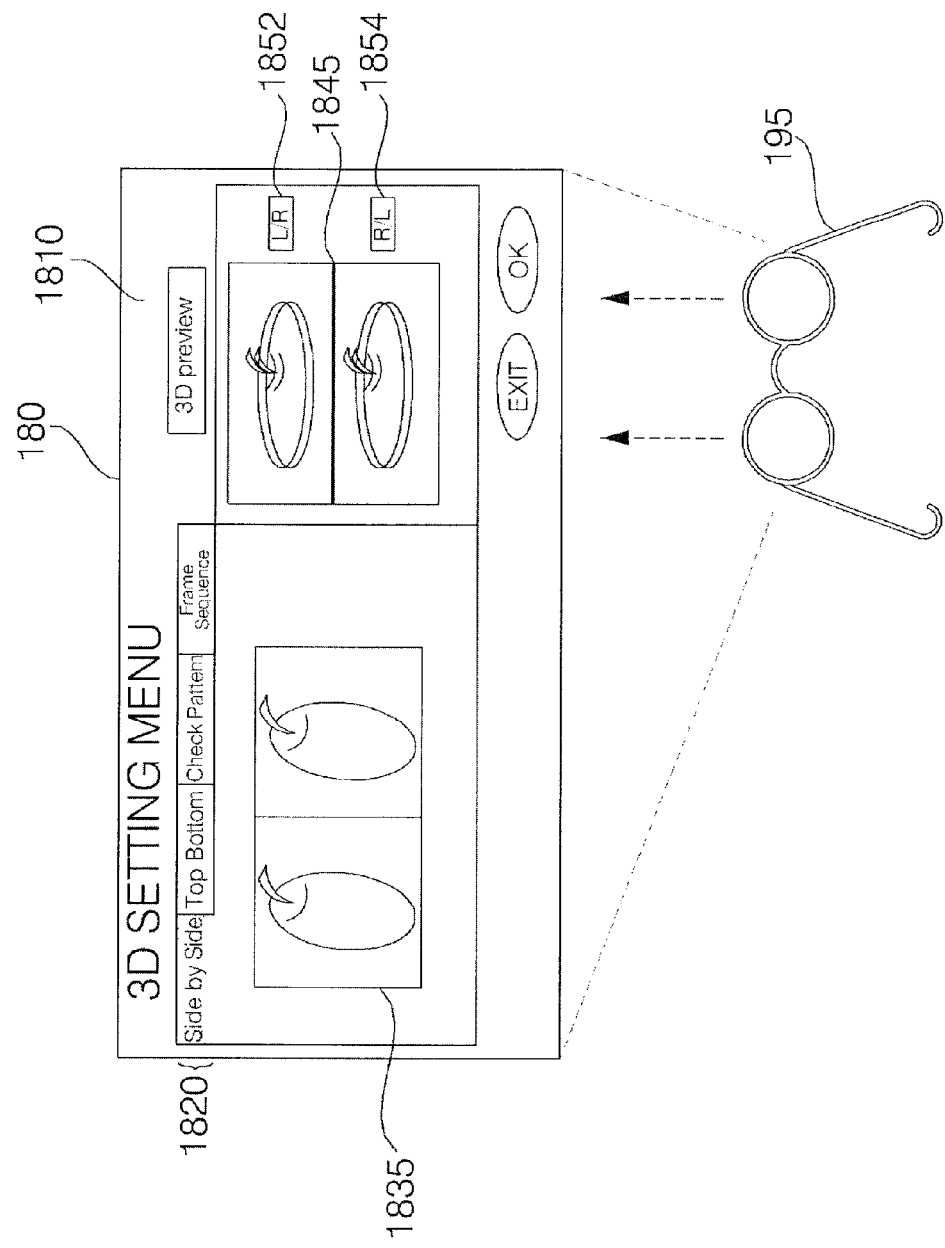

FIG. 31 illustrates a 3D image 1845 similar to the 3D image 1840 but different from the 3D image 1849 in that first and second 3D images are arranged vertically in the 3D image 1845.

Hence, the first ordering object 1852 indicating the L/R ordering and the second ordering object 1854 indicating the R/L ordering may be displayed on the right of the 3D image 1845.

As is apparent from the above description of the exemplary embodiments of the present invention, when a 3D image is displayed, a 3D setting menu is displayed to enable a user to easily set at least one of a 3D format or an ordering of left-eye and right-eye images forming the 3D image. Therefore, user convenience is increased.

Objects representing a plurality of 3D formats are displayed and thus the user can easily set an intended 3D format. Especially when a 3D format is selected, a 3D image is displayed in the selected 3D format. Hence, the user can intuitively set a 3D format, wearing 3D glasses.

Objects indicating orderings of left-eye and right-eye images that form a 3D image are displayed so that the user can readily set an ordering. Especially when a specific ordering is selected, a 3D image is displayed according to the selected ordering. Hence, the user can intuitively set a left-eye and right-eye image ordering, wearing 3D glasses.

To facilitate the user's selection of an ordering of left-eye and right-eye images forming a 3D image, at least part of a first 3D image with an L/R ordering and at least part of a second 3D image with an R/L ordering are displayed together. Hence, the user can select an appropriate ordering of the left-eye and right-eye images, wearing the 3D glasses.

The image display apparatus and the method for operating the same according to the foregoing exemplary embodiments are not restricted to the exemplary embodiments set forth herein. Therefore, variations and combinations of the exemplary embodiments set forth herein may fall within the scope of the present invention.

The method for operating an image display apparatus according to the foregoing exemplary embodiments may be implemented as code that can be written on a computer-readable recording medium and can thus be read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image display apparatus comprising:
a display;
a remote controller including a 3D key, and directional keys;
a controller configured to control the display to display a three-dimensional (3D) format setting menu when the 3D key of the remote controller is pressed,
wherein the controller is configured to display the 3D format setting menu in a pop-up window,
wherein the 3D format setting menu is overlaid on an on-going image on the display,
wherein the 3D format setting menu includes a plurality of objects, the plurality of objects including a first object indicating a top and bottom format and a second object indicating a side-by-side format,
wherein the first object includes a first image and a second image, which is the same as the first image, which are arranged in a top and bottom arrangement, respectively,
wherein the second object includes a third image and a fourth image, which is the same as the third image, which are arranged in a left side and a right side arrangement, respectively,
wherein when a direction key among the directional keys of the remote controller is pressed, the controller is configured to move focus of the first object to the second object, to convert the on-going image as a converted image corresponding to the second object, and to display the converted image with the 3D format setting menu,
wherein the 3D format setting menu further includes a move icon indicating movement of the focus among the plurality of objects, a setting icon indicating selection of one of the plurality of objects, and an exit icon indicating termination of display of the 3D setting menu, and
wherein, when the 3D Key is pressed during displaying a 3D image, the controller is configured to terminate displaying the 3D image.

2. The image display apparatus according to claim 1, wherein the 3D format setting menu is displayed along with a 3D image set by the 3D format setting menu on the display by manipulation of the 3D key of the remote controller.

3. The image display apparatus according to claim 1, wherein the remote controller further includes a first key,
wherein when the first key of the remote controller is pressed, the controller is configured to select a 3D format corresponding to a focused object among the plurality of objects displayed in the 3D format setting menu.

4. The image display apparatus according to claim 1, wherein the controller is configured to generate a 3D image by performing 3D processing on an input image according to a selected 3D format among a plurality of 3D formats after setting the 3D setting using the 3D format setting menu and to control the 3D image to be displayed on the display.

5. The image display apparatus according to claim 4, wherein the controller is configured to change a depth of the 3D image according to a depth setting input.

6. The image display apparatus according to claim 4, wherein the controller comprises:
a video processor configured to decode the input image; and
a formatter configured to separate the decoded image into a left-eye image and a right-eye image and generate a 3D image using the left-eye and right-eye images according to the selected 3D format.

7. An image display apparatus comprising:
a display;
a controller configured to control the display to display a three-dimensional (3D) format setting menu when a 3D key of a remote controller is pressed,
wherein the controller is configured to display the 3D format setting menu in a pop-up window,
wherein the 3D format setting menu is overlaid on an on-going image on the display,
wherein the 3D format setting menu includes a plurality of objects, the plurality of objects including a first object indicating a top and bottom format and a second object indicating a side-by-side format,
wherein the first object includes a first image and a second image, which is the same as the first image, which are arranged in a top and bottom arrangement, respectively,
wherein the second object includes a third image and a fourth image, which is the same as the third image, which are arranged in a left side and a right side arrangement, respectively,
wherein when a direction key among directional keys of the remote controller is pressed, the controller is configured to move focus of the first object to the second object, to convert the on-going image as a converted image corresponding to the side-by-side format, and to display the converted image with the 3D format setting menu, wherein the 3D format setting menu further includes a move icon indicating movement of the focus among the plurality of objects, a setting icon indicating selection of one of the plurality of objects, and an exit icon indicating termination of display of the 3D setting menu, and wherein, when the 3D Key is pressed during displaying a 3D image, the controller is configured to terminate displaying the 3D image.

8. The image display apparatus according to claim 7, wherein the 3D format setting menu is displayed along with a 3D image set by the 3D format setting menu on the display by manipulation of the 3D key of the remote controller.

9. The image display apparatus according to claim 7, wherein when a first key of the remote controller is pressed, the controller is configured to select a 3D format corresponding to a focused object among the plurality of objects displayed in the 3D format setting menu.

10. The image display apparatus according to claim 7, wherein the controller is configured to generate a 3D image by performing 3D processing on an input image according to a selected 3D format among a plurality of 3D formats after setting the 3D setting using the 3D format setting menu and to control the 3D image to be displayed on the display.

11. The image display apparatus according to claim 10, wherein the controller is configured to change a depth of the 3D image according to a depth setting input.

12. The image display apparatus according to claim 10, wherein the controller comprises:
 a video processor configured to decode the input image; and
 a formatter configured to separate the decoded image into a left-eye image and a right-eye image and generate a 3D image using the left-eye and right-eye images according to the selected 3D format.

13. A method for operating an image display apparatus, comprising:
 displaying an on-going image;
 displaying a three-dimensional (3D) format setting menu when a 3D key of a remote controller is pressed, wherein the 3D format setting menu is displayed in a pop-up window and the 3D setting menu is overlaid on the on-going image on the display, and the 3D format setting menu includes a plurality of objects, the plurality of objects including a first object indicating a top and bottom format and a second object indicating a side-by-side format; and when a direction key among a plurality of directional keys of the remote controller is pressed, moving focus of the first object to the second object, converting the on-going image as a converted image corresponding to the side-by-side format, and displaying the converted image with the 3D format setting menu, wherein, when the 3D Key is pressed during displaying a 3D image, terminating the 3D image, and wherein the 3D format setting menu further includes a move icon indicating movement of the focus among the plurality of objects, a setting icon indicating selection of one of the plurality of objects, and an exit icon indicating termination of display of the 3D setting menu, wherein the first object includes a first image and a second image, which is the same as the first image, which are arranged in a top and bottom arrangement, respectively, wherein the second object includes a third image and a fourth image, which is the same as the third image, which are arranged in a left side and a right side arrangement, respectively.

14. The method according to claim 13, further comprising, when a first key of the remote controller is pressed, selecting a 3D format corresponding to a focused object among the plurality of objects displayed in the 3D setting menu.

15. The method according to claim 13, further comprising:
 generating a 3D image by performing 3D processing on an input image according to a selected 3D format among a plurality of 3D formats after setting the 3D format setting using the 3D setting menu; and
 displaying the 3D image.

16. The method according to claim 15, further comprising changing a depth of the 3D image according to a depth setting input.

17. The method according to claim 15, wherein the generating step comprises:
 decoding the input image;
 separating the decoded image into a left-eye image and a right-eye image; and
 generating the 3D image using the left-eye and right-eye images according to the selected 3D format.

* * * * *